(12) United States Patent
Mori et al.

(10) Patent No.: US 6,208,755 B1
(45) Date of Patent: *Mar. 27, 2001

(54) METHOD AND APPARATUS FOR DEVELOPING A CHARACTER RECOGNITION DICTIONARY

(75) Inventors: Shigeki Mori, Koshigaya; Katsuhiko Sakaguchi, Kawasaki; Kazuhiro Matsubayashi, Yokohama; Tsunekazu Arai, Tama; Takashi Harada; Eiji Takasu, both of Yokohama; Hiroto Yoshii, Tokyo, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/374,819

(22) Filed: Jan. 19, 1995

(30) Foreign Application Priority Data

Jan. 26, 1994 (JP) .................................................. 6-007094

(51) Int. Cl.$^7$ ...................................................... G06K 9/00
(52) U.S. Cl. ............................................. 382/187; 382/161
(58) Field of Search ................................... 382/185, 187, 382/229, 161, 186, 188, 189

(56) References Cited

U.S. PATENT DOCUMENTS

| 4,573,196 | * | 2/1986 | Crane et al. ........................... 382/185 |
| 4,589,142 | * | 5/1986 | Bednar ................................... 382/226 |
| 4,866,646 | * | 9/1989 | Nakamura et al. .................... 382/187 |
| 5,113,452 | * | 5/1992 | Chatani et al. ....................... 382/187 |
| 5,191,622 | * | 3/1993 | Shojima et al. ...................... 382/161 |
| 5,267,327 | * | 11/1993 | Hirayama ............................. 382/161 |
| 5,319,721 | * | 6/1994 | Chefalas et al. ..................... 382/187 |
| 5,327,609 | * | 7/1994 | Sanada et al. ........................ 395/2.6 |
| 5,333,209 | * | 7/1994 | Sinden et al. ........................ 382/187 |
| 5,533,141 | * | 7/1996 | Futatsugi et al. .................... 382/188 |

FOREIGN PATENT DOCUMENTS

| 59-106085 | 6/1984 | (JP) . |
| 59-165190 | 9/1984 | (JP) . |
| 61-136181 | 6/1986 | (JP) . |
| 64-44586 | 2/1989 | (JP) . |
| 1-103787 | 4/1989 | (JP) . |

* cited by examiner

*Primary Examiner*—Yon J. Couso
(74) *Attorney, Agent, or Firm*—Fitzpatrick, Cella, Harper & Scinto

(57) ABSTRACT

A pattern recognizing apparatus which recognizes patterns on the basis of a recognition dictionary includes a frequency information updating device for updating a plurality of items of frequency information, respectively assigned to a plurality of reference patterns, in accordance with a reference to at least one of the plurality of reference patterns during recognition and a recognition dictionary reconfiguration device for reconfiguring the recognition dictionary based on a difference between the updated frequency information.

29 Claims, 42 Drawing Sheets

FIG. 14

| | SCORE BY PATTERN MATCHING | SCALE FACTOR BY REFERENCE ORDER | TOTAL SCORE |
|---|---|---|---|
| IN THE CASE OF CHARACTER "土" | 90 | × 1.0 = | 90 |
| | 60 | × 0.8 = | 48 |
| | 30 | × 0.6 = | 18 |
| IN THE CASE OF CHARACTER "上" | 60 | × 1.0 = | 60 |
| | 100 | × 0.8 = | 80 |
| | 60 | × 0.6 = | 36 |
| | 30 | × 0.4 = | 12 |

FIG. 15

|  | SCORE BY PATTERN MATCHING | SCALE FACTOR BY REFERENCE ORDER | TOTAL SCORE |
|---|---|---|---|
| IN THE CASE OF CHARACTER "士" | 90 × 1.0 = 90 | | |
| | 60 × 0.8 = 48 | | |
| | 30 × 0.6 = 18 | | |
| IN THE CASE OF CHARACTER "上" | 100 × 1.0 = 100 | | |
| | 60 × 0.8 = 48 | | |

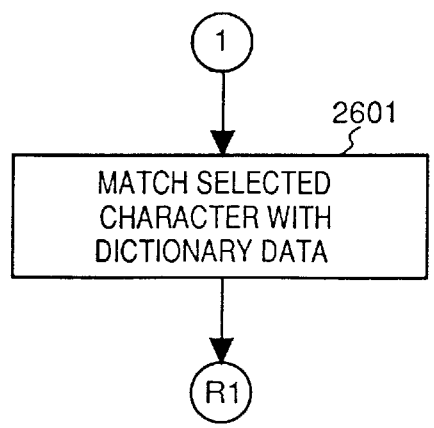
FIG. 22
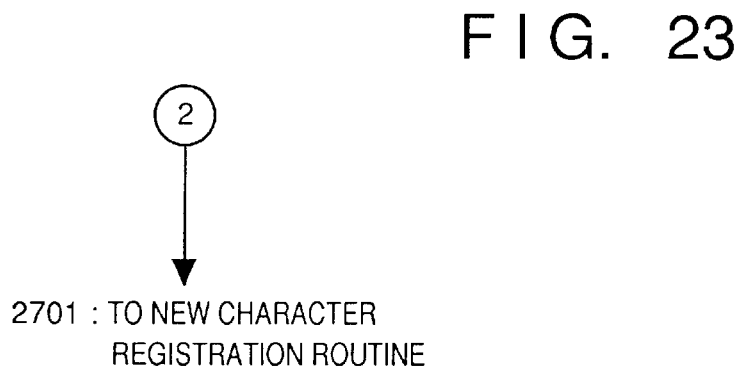
FIG. 23
FIG. 24
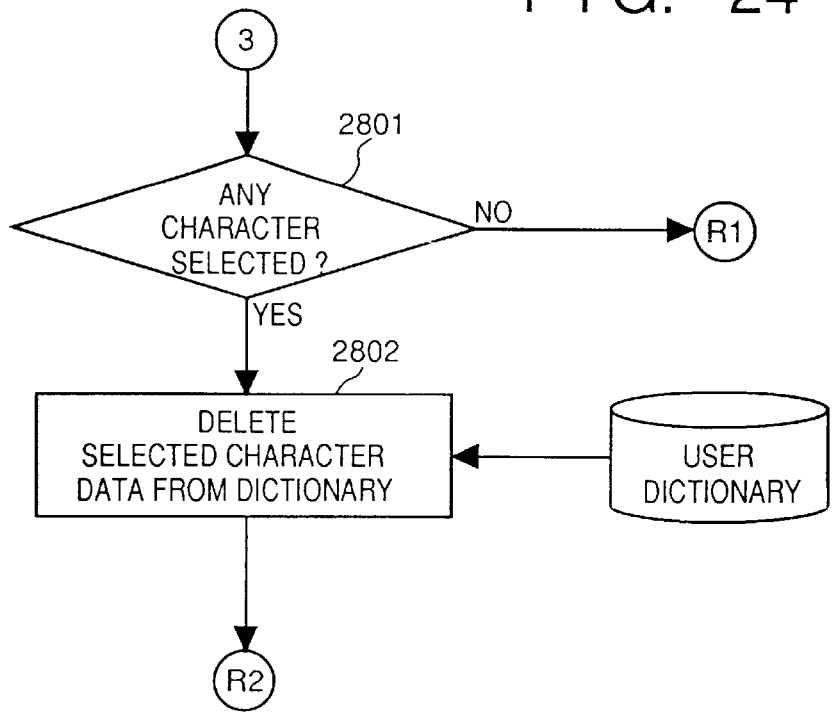

FIG. 39

| | | | |
|---|---|---|---|
| ,ㅇㅊ, | | ,ㅇㅊ, | ,ㅇㅊ, |
| ,ㅣ, | | ,ㅔ, | ,ㅣ, |
| ,ㅏ, | | ,ㅡ, | ,ㅜ, |
| ,ㅜ, | ,ㅇㅊ, | ,ㅣ, | ,ㅕ, |
| ,g, | ,ㅣ, | ,s, | ,ㅐ, |
| ,ㅔ, | ,ㅐ, | ,ㅔ, | ,u, |
| ,ㅕ, | ,ㅐ, | ,u, | ,ㅔ, |
| ,ㅐ, | ,ㅓ, | ,ㅓ, | ,ㅕ, |
| ,s, | ,ㅐ, | | |

FIG. 40

| STORAGE NO. | CHARACTER CODE | NUMBER OF STROKES |
|---|---|---|
| 1 | 0x2450 | 5 |
| 2 | 0x3C2A | 6 |
| 3 | 0x4544 | 5 |
| 4 | 0x4E3E | 6 |
| 5 | 0x3244 | 5 |
| 6 | 0x4168 | 6 |
| 7 | 0x3140 | 12 |
| 8 | 0x3171 | 8 |

F I G. 43

| STORAGE NO. | CHARACTER CODE | DATE OF REGISTRATION |
|---|---|---|
| 1 | 0x2450 | AUG. '92 |
| 2 | 0x3C2A | SEP. '92 |
| 3 | 0x4544 | AUG. '92 |
| 4 | 0x4E3E | SEP. '92 |
| 5 | 0x3244 | AUG. '92 |
| 6 | 0x4168 | SEP. '92 |
| 7 | 0x3140 | DEC. '92 |
| 8 | 0x3171 | OCT. '92 |

FIG. 46

| STORAGE NO. | CHARACTER CODE | RADICAL CODE |
|---|---|---|
| 1 | 0x647D | CODE OF "糸" 0x6 |
| 2 | 0x3E5C | CODE OF "言" 0x7 |
| 3 | 0x3948 | CODE OF "糸" 0x6 |
| 4 | 0x3B6D | CODE OF "言" 0x7 |
| 5 | 0x3D4C | CODE OF "糸" 0x6 |
| 6 | 0x6B3E | CODE OF "言" 0x7 |
| 7 | 0x3577 | CODE OF "足" 0x9 |
| 8 | 0x4F29 | CODE OF "足" 0x9 |

METHOD AND APPARATUS FOR DEVELOPING A CHARACTER RECOGNITION DICTIONARY

BACKGROUND OF THE INVENTION

The present invention relates to a method and apparatus for handwritten character recognition in which handwritten characters are recognized on the basis of a recognition dictionary.

Conventionally, in a handwritten character recognizing apparatus, the types of characters to be recognized are prepared from handwritten data of tens of people in order to support stroke orders, numbers of strokes, etc. that differ from user to user, and dictionary data that is referred to by various stroke orders or various numbers of strokes is registered in a recognition dictionary beforehand. Nowadays, there is a tendency to store more and more dictionary data, in order to attain an increased recognition ratio.

However, such an increase in the amount of dictionary data leads to the presence of a large amount of dictionary data corresponding to various stroke orders and various numbers of strokes that are rarely used, resulting in a waste of storage capacity. Further, the trend has been toward an increase in information storage capacity despite the progression of miniaturization of information apparatuses. Thus, there is a demand for a reduction in the amount of useless information to a minimum.

Further, conventionally, the display of a large number of character patterns registered by the user is simply given in the form of a list in which characters are arranged according to the order of registration or the order of character codes, so that it takes some effort to find the intended character from such a list

SUMMARY OF THE INVENTION

The present invention has been made with a view toward eliminating the above problems in the prior art. It is an object of the present invention to provide a method and apparatus for handwritten character recognition in which the user repeats handwriting recognition, thereby positively reducing the amount of information stored in the recognition dictionary and effectively utilize the storage device.

Further, the present invention provides a reference pattern registering method according to which registered patterns are displayed such that intended characters can be found easily, and a handwritten character recognizing apparatus in which this method is to be used.

To achieve the above object, there is provided, in accordance with the present invention, a handwritten character recognizing apparatus which recognizes handwritten characters on the basis of a recognition dictionary, said handwritten character recognizing apparatus comprising: selection information updating means for updating a plurality of items of selection information, which are respectively assigned to a plurality of reference patterns corresponding to one object of recognition, in accordance with the reference condition at the time of recognition; and recognition dictionary reconfiguration means for reconfiguring the recognition dictionary on the basis of the plurality of items of selection information.

According to the present invention, there is further provided a handwritten character recognizing apparatus further comprising selection information comparing means for comparing the plurality of items of selection information, wherein the recognition dictionary reconfiguration means reconfigures the recognition dictionary on the basis of the results obtained by the selection information comparing means. Further, the selection information includes frequency information, and, each time the reference pattern is referred to, the selection information updating means increases the frequency information of the corresponding item of selection information. Further, when at least one of the differences of the frequency information has reached a predetermined value, the recognition dictionary reconfiguration means reconfigures the above-mentioned recognition dictionary. Further, the recognition dictionary reconfiguration means reconfigures the recognition dictionary at a predetermined point in time. Further, the recognition dictionary reconfiguration means performs reconfiguration according to the order of frequency of reference as known from the frequency information to initialize the frequency information. Further, when the frequency referred to is not higher than a predetermined frequency, the recognition dictionary reconfiguration means deletes the corresponding reference pattern. Further, the selection information includes frequency information and time lapse information, and the recognition dictionary reconfiguration means checks whether or not there a pattern that is repeatedly referred to even after a predetermined period of time has elapsed, and, when a pattern has been generated which is repeatedly referred to at a predetermined frequency after the lapse of the predetermined period of time, reconfigures the recognition dictionary.

Further, in accordance with the present invention, there is provided a handwritten character recognizing apparatus which recognizes handwritten characters on the basis of a recognition dictionary that allows registration of reference patterns by the user, the handwritten character recognizing apparatus comprising: registered pattern display means for displaying registered patterns; and registered pattern information rearranging means for rearranging the registered patterns displayed in accordance with a predetermined condition, wherein the registered pattern information rearranging means rearranges the registered patterns according to the number of strokes of the registered patterns. Further, the registered pattern information rearranging means rearranges the registered patterns according to the dates of registration of the registered patterns. Further, the registered pattern information rearranging means rearranges the registered patterns according radical information on the registered patterns.

Further, in accordance with the present invention, there is provided a handwritten character recognizing method in which handwritten characters are recognized on the basis of a recognition dictionary, the method comprising the steps of: assigning a plurality of items of selection information respectively to a plurality of reference patterns with respect to one object of recognition and updating the selection information on the basis of the reference at the time of recognition; reconfiguring the recognition dictionary on the basis of the plurality of items of selection information; and recognizing handwritten characters on the basis of the reconfigured recognition dictionary.

In accordance with the present invention, there is further provided a reference pattern registration method for use in a handwritten character recognizing apparatus which recognizes handwritten characters on the basis of a recognition dictionary that allows registration of reference patterns by the user, the reference pattern registration method comprising the steps of: setting a desired condition when registered patterns are displayed; and rearranging the registered patterns displayed according to the set condition, wherein the condition consists of the numbers of strokes of the registered patterns, the registered patterns being rearranged on the basis of the numbers of strokes in the step of rearranging the registered patterns. Further, the above-mentioned condition may be the dates of registration of the registered patterns, in which case the registered patterns are rearranged on the basis of the dates of registration in the step of rearranging the registered patterns. Further, the above-mentioned condition may be radical (sub set of character pattern) information on the registered patterns, in which case the registered patterns are rearranged on the basis of the radical information on the registered patterns in the step of rearranging the registered patterns. As described above, the present invention provides a method and apparatus for handwritten character recognition in which the user repeats handwritten character recognition, whereby the amount of information stored in the recognition dictionary can be positively reduced and the storage device can be effectively utilized.

Further, the present invention provides a pattern registering method and a handwritten character recognizing apparatus in which registered patterns are displayed such that intended characters can be easily found.

Specifically, when obtaining a desired object of recognition, those portions of a plurality of items of reference data which have been prepared for the purpose of obtaining desired objects of recognition but which are totally unnecessary to the user, can be deleted one by one without causing any special time and labor to the user, so that the more the user uses the dictionary, the further it can be reduced in size. Further, since the entire dictionary can be reduced in size, reference to unnecessary data can be avoided, thereby expediting the recognition process.

Further, a means for rearranging the registered patterns is provided by means of which the registered patterns are rearranged according to registration pattern information, such as information regarding the numbers of strokes, dates of registration, or radicals, whereby, when a display of registration patterns are designated, the stored registered patterns are rearranged in an easy-to-understand way on the basis of the information on the registered patterns when they are displayed. Further, it is possible to display patterns selected from a designated group of registered patterns. Thus, the present invention can provide a user-friendly handwritten character recognizing apparatus.

Many other features, advantages and additional objects of the present invention will become manifest to those versed in the art upon making reference to the detailed description which follows and the accompanying drawings.

BRIEF DESCRIPTION OF THE DRAWINGS

FIG. 14 is a diagram illustrating an evaluation at the time of dictionary reconfiguration of this embodiment;

FIG. 15 is a diagram illustrating an evaluation at the time of dictionary reconfiguration of this embodiment;

FIG. 22 is a flowchart showing a character selection process of this embodiment;

FIG. 23 is a flowchart showing a character registration process of this embodiment;

FIG. 24 is a flowchart showing a character deleting process of this embodiment;

FIG. 39 is a schematic diagram showing a user name file of this embodiment;

FIG. 40 is a schematic diagram showing an example of the registered-character pattern correspondence table of this embodiment;

FIG. 43 is a schematic diagram showing another example of the registered-character pattern correspondence table of this embodiment;

FIG. 46 is a schematic diagram showing still another example of the registered-character pattern correspondence table of this embodiment;

DESCRIPTION OF THE PREFERRED EMBODIMENT

An embodiment of the present invention will now be described in detail with reference to the accompanying drawings.

Example of Dictionary Reconfiguration

Figure 1:
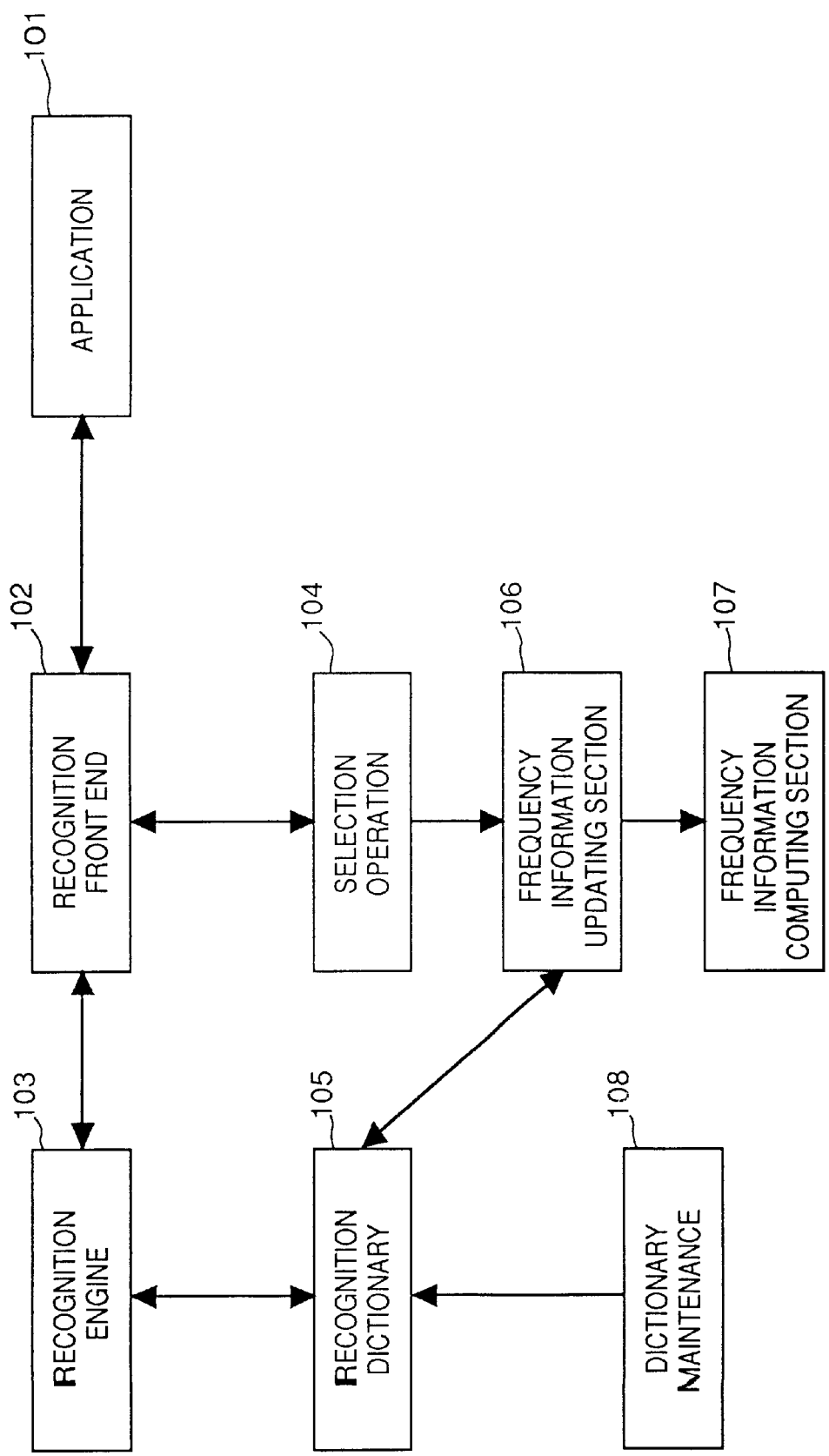
FIG. 1 is a block diagram showing the system configuration of a handwritten character recognizing apparatus according to the present invention in connection with the dictionary reconfiguration process.

FIG. 1 is a block diagram related to the dictionary reconfiguration executed in the handwritten character recognizing apparatus of this embodiment.

Figure 4:
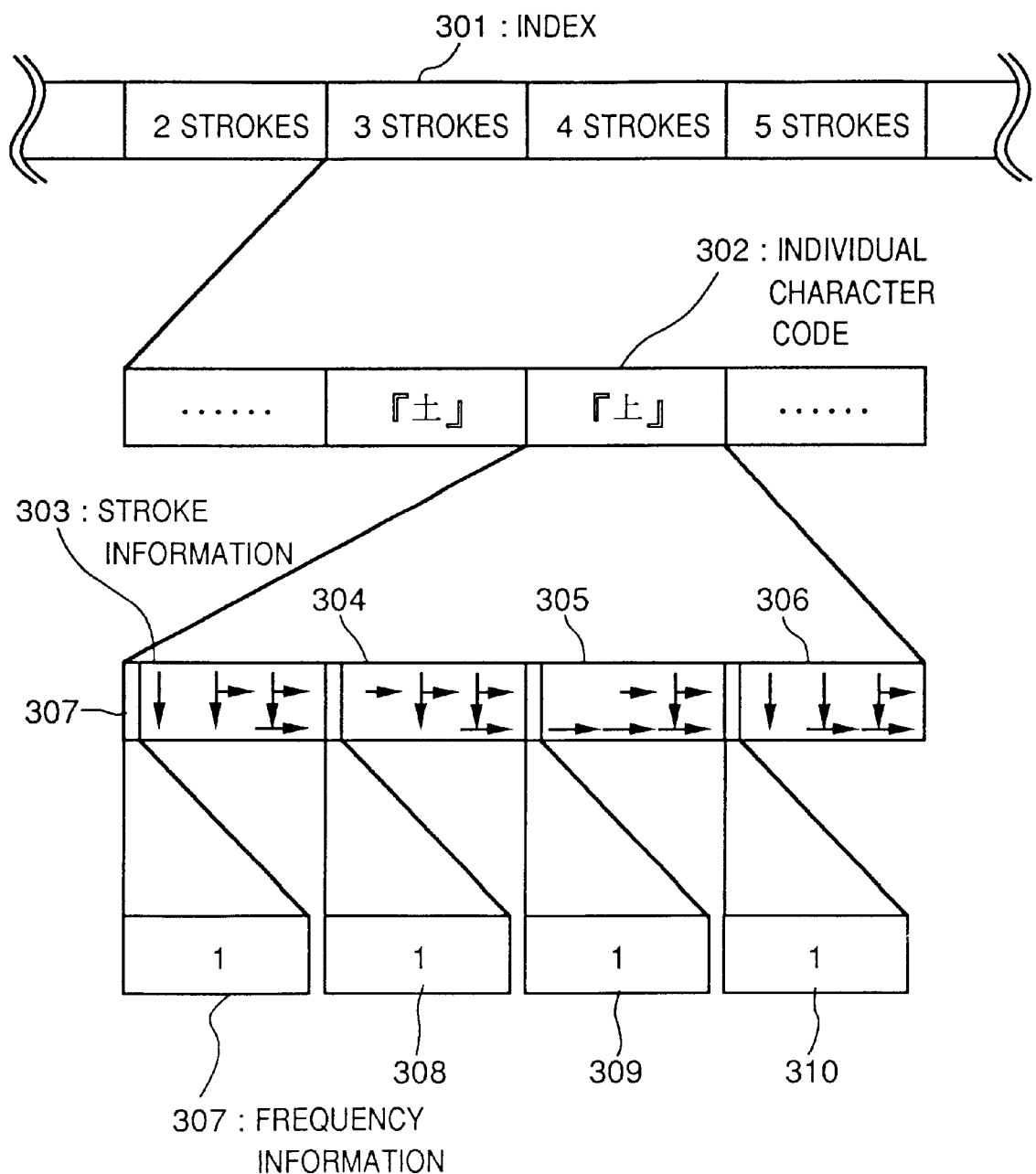
FIG. 4 is a diagram illustrating the dictionary reconfiguration operation of this embodiment.
Figure 5:
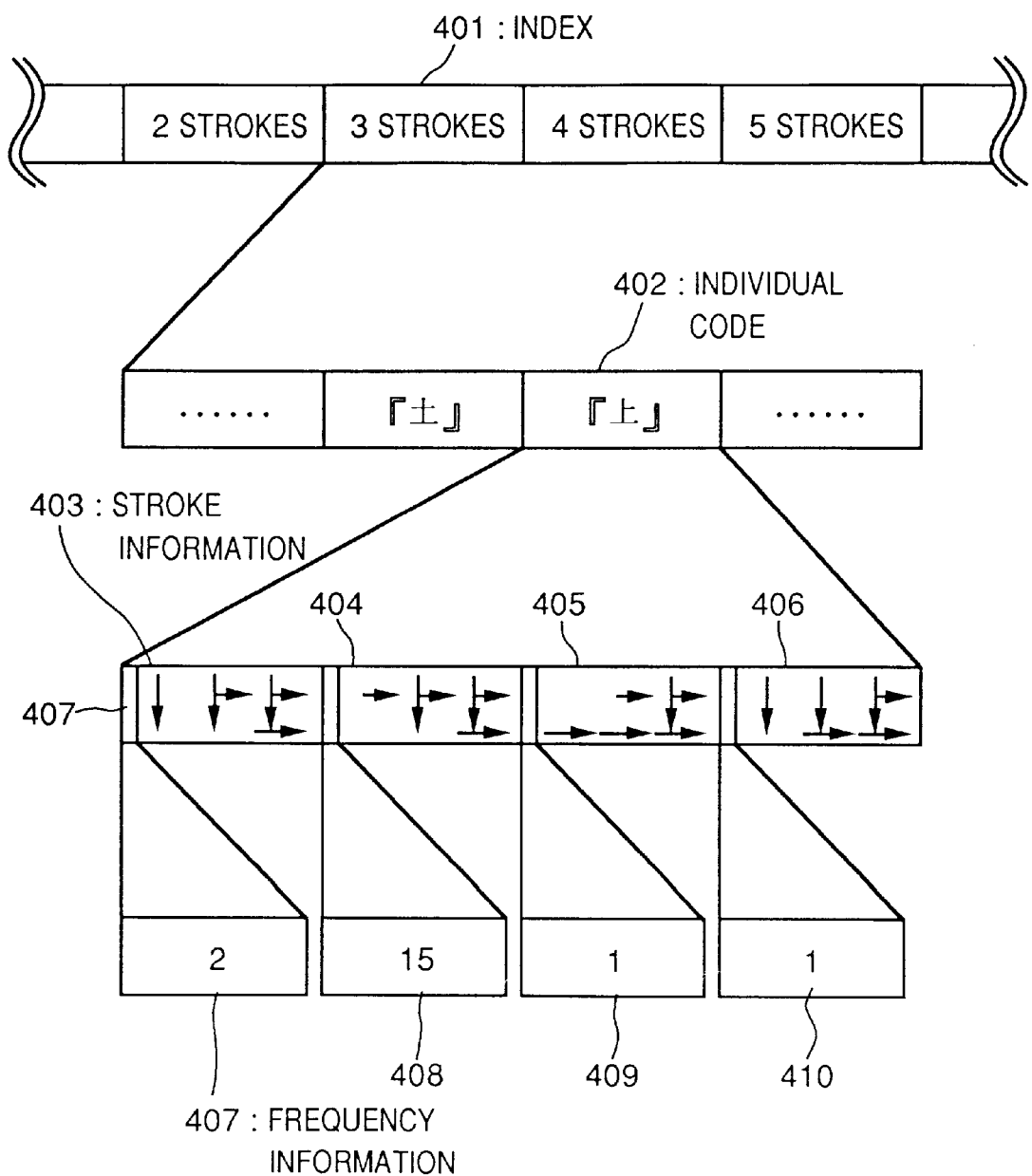
FIG. 5 is a diagram illustrating the dictionary reconfiguration operation of this embodiment.
Figure 12:
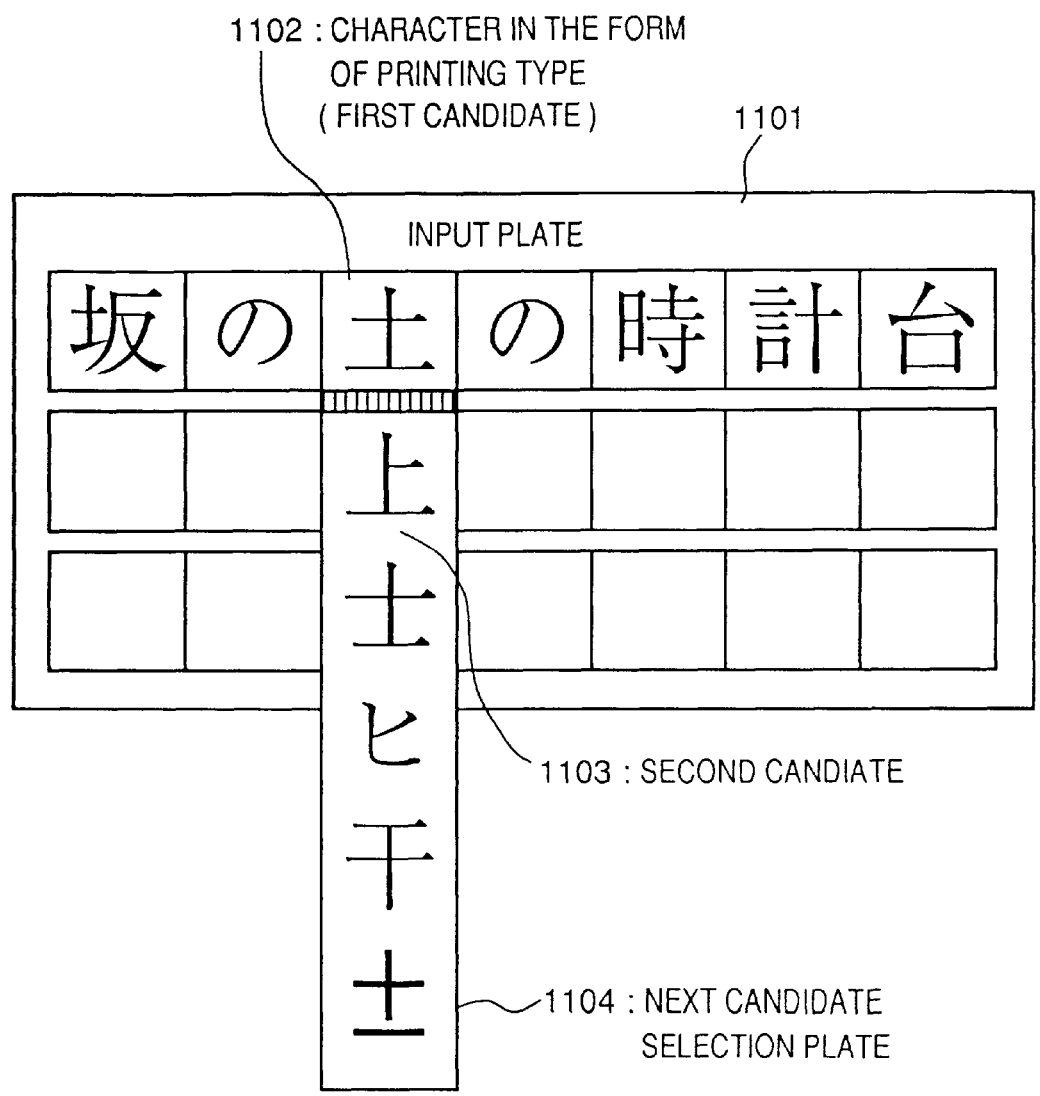
FIG. 12 is a diagram illustrating a handwritten character recognition of this embodiment.

Numerals 101 through 108 indicate components that are the functional elements comprising a recognizing operation for on-line character recognition. Numeral 101 indicates an application which is being executed by the user in this handwriting recognizing apparatus. This application is associated with a recognizing operation by handwriting input as shown in FIG. 12. Numeral 102 indicates a recognition front end section that serves as a user interface between the application 101 and the recognizing operation. It supplies a recognition engine 103 with commands regarding the transfer of handwriting data from the user or the application, the starting of the recognizing operation, the selection of candidates, and so on. The recognition engine 103 performs recognition on the basis of data in a recognition dictionary 105. Here, suffice to say that it performs recognition by using a well-known technique, such as the stroke matching method, and a detailed description thereof will be omitted. FIG. 4 illustrates the contents of the recognition dictionary 105 in the initial state. As shown in the drawing, the recognition dictionary 105 comprises the following sections: an index section 301 classifying character data according to the numbers of strokes of the characters on the basis of information on handwritten data transferred from the recognition front end section 102; a storage section 302 in which the individual codes of the characters classified according to their numbers of strokes are stored; and stroke information groups 303 through 306 that consist of a plurality of stroke orders with respect to each of the individual characters.

Here, the plurality of stroke information groups, which constitute the object of recognition evaluation in the recognition engine 103. The stroke information groups, which are recognized and evaluated one by one, starting from the foremost one, are usually arranged in the descending order of expected evaluation point at the time of recognition evaluation. Due to this arrangement, breaking off, that is, cutting off, at a predetermined evaluation point can be effected in the recognition engine 103 when a plurality of stroke information groups are to be successively evaluated, thereby expediting the recognition process.

While FIG. 4 shows the stroke information groups 303 through 306 in the form of actual stroke orders and strokes for the sake of convenience, these stroke information groups, in reality, are in the form of series of coordinate data values. Frequency information sections 307 through 310 for storing frequency information are respectively provided in the foremost section of each stroke information pattern of the stroke information groups 303 through 306. In FIG. 4, the frequency information is also in the initial state, and the initial value "1" is stored. In FIG. 1, numeral 104 indicates a selection operation section which, when a recognition candidate is selected and determined in the recognition front end section 102, obtains the stroke information pattern actually used and notifies a frequency information updating section 106 of this procedure. The frequency information updating section 106 is a section which updates the frequency information portion of the recognition dictionary 105 in response to the notification from the selection operation section 104. Numeral 107 indicates a section which performs computation with respect to the information updated in the frequency information updating section 106, and requires a dictionary maintenance section 108 to perform maintenance of the dictionary depending upon the computation results.

Figure 2:
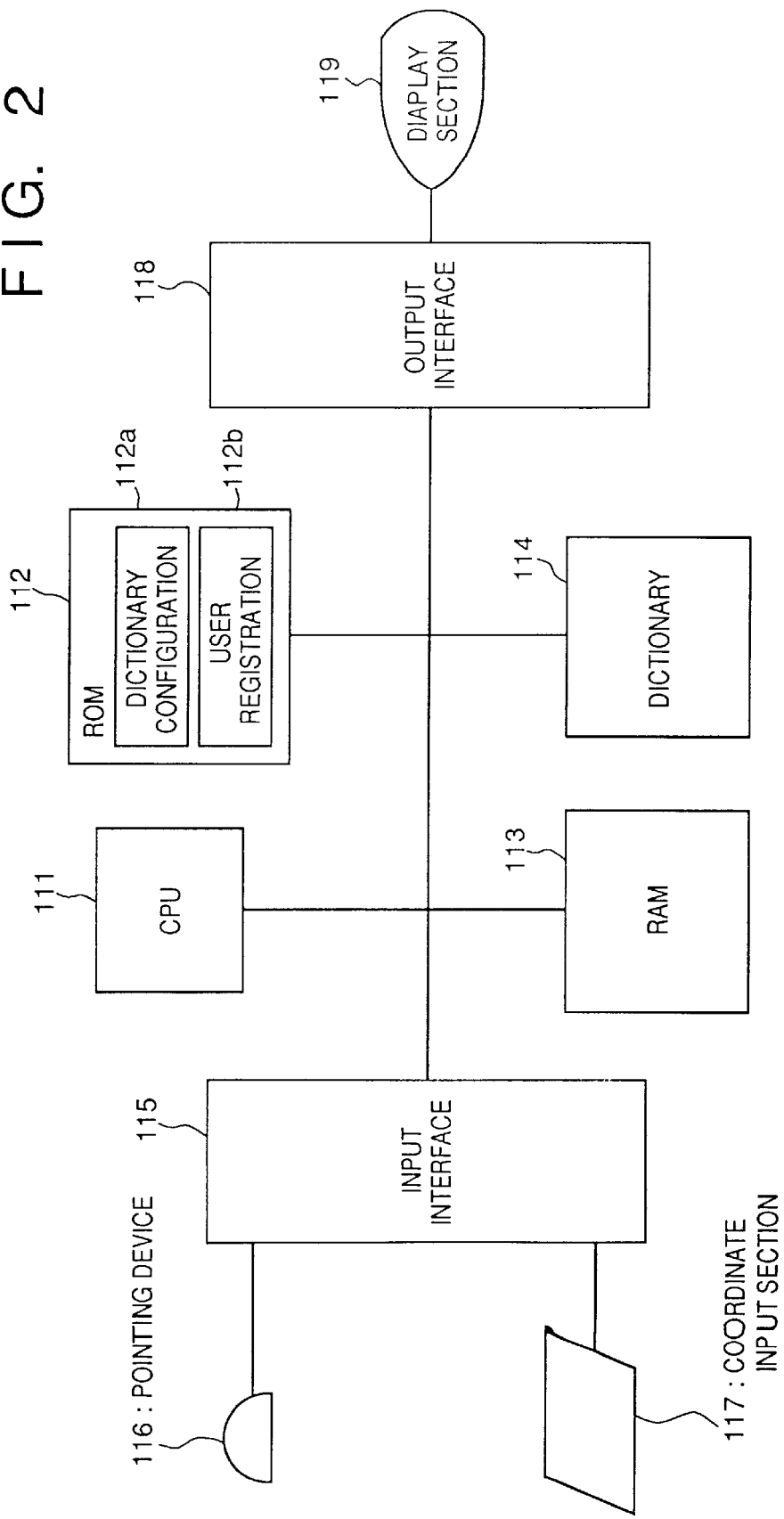
FIG. 2 is a block diagram showing the hardware configuration of the handwritten character recognizing apparatus of this embodiment.

FIG. 2 is a block diagram showing an example of the hardware configuration of the handwritten character recognizing apparatus of this embodiment.

Figure 3:
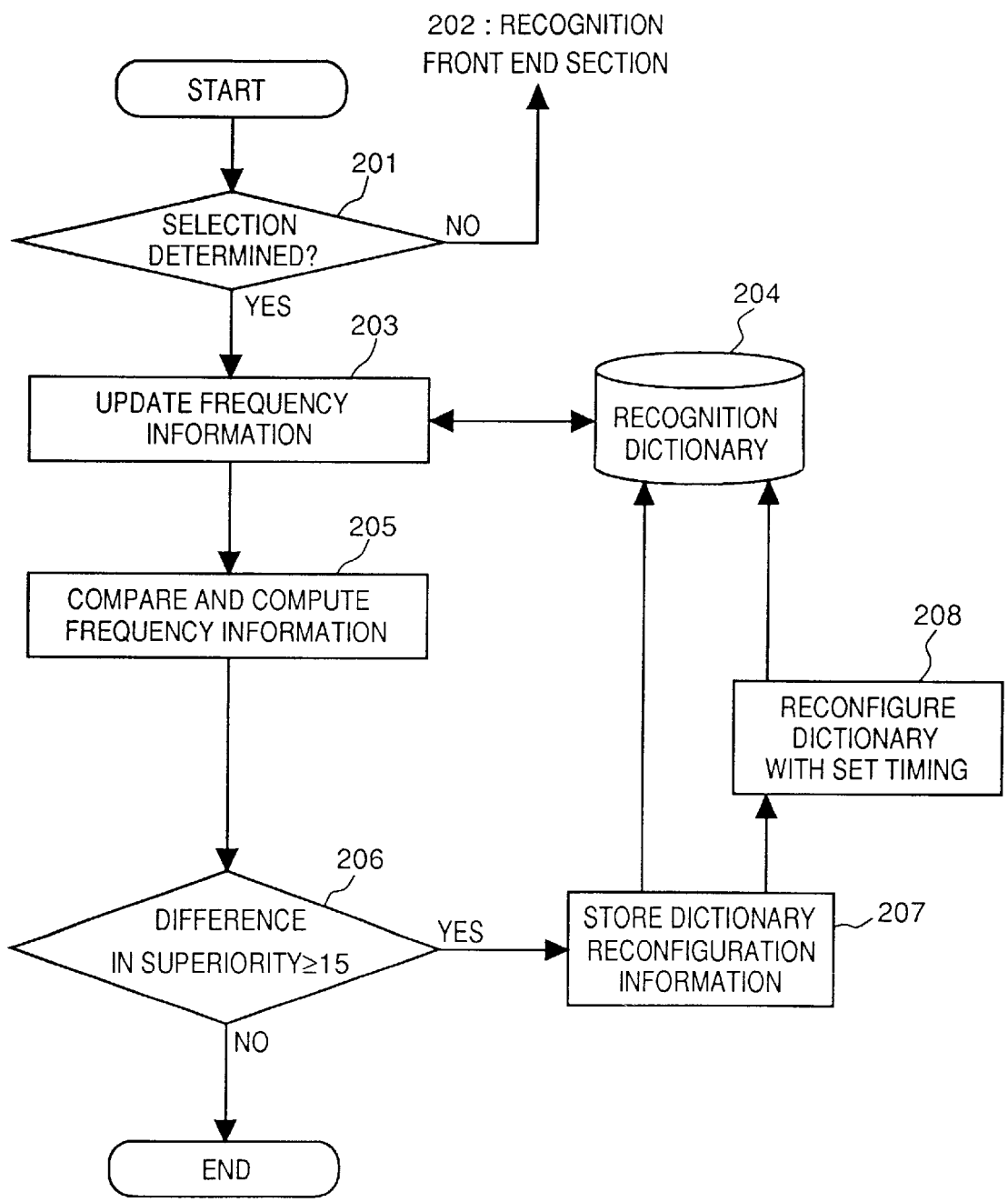
FIG. 3 is a flowchart showing the flow of dictionary reconfiguration procedures.

Numeral 111 indicates a CPU for computation control; numeral 112 indicates a ROM for storing processing procedures for CPU 111, for example, a dictionary reconfiguration program 112a as shown in FIG. 3 and a user registration and display program 112b as shown FIGS. 19 through 32, 41, 45, and 48; numeral 113 indicates a RAM for auxiliary storage; numeral 114 indicates a dictionary in which reference patterns for handwritten character recognition, etc. are registered; numeral 115 indicates an input interface to which an input device, such as pointing device (e.g., a mouse) 116 and a coordinate input section 117, is connected; and numeral 118 indicates an output interface to which an output device, such as a display section (e.g., a CRT) 119, is connected. Further, though not shown, an input device, such as a keyboard, and an output device, such as a printer, may also be connected.

This embodiment will now be described in detail with reference to the flowchart of FIG. 3 and FIGS. 5 through 9 and 12. When the results of recognition performed by the recognition engine 103 are obtained in the recognition front end section 102 of FIG. 1, a character 1102 in the form of a printing type is displayed in an input plate 1101 of FIG. 12, and, at the same time, the flowchart of FIG. 3 is started.

In step 201, a judgment is made as to whether the selection of the candidate obtained is a determined one or not. If it is a determined one, the procedure moves to frequency information updating operation in step 203. If it is not determined yet, the control is returned to the monitor section in the recognition front end section 102 again.

Figure 13:
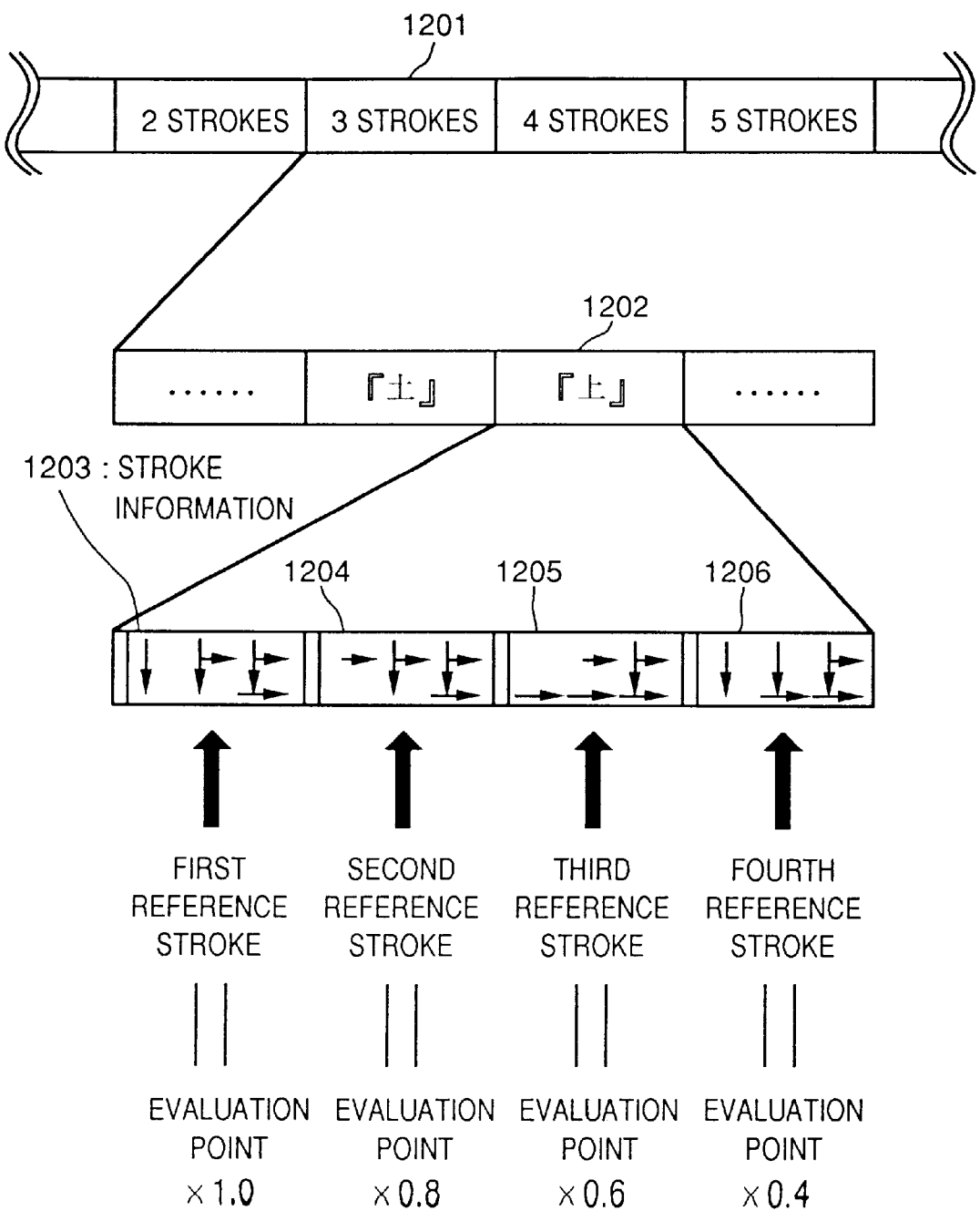
FIG. 13 is a diagram illustrating an evaluation at the time of dictionary reconfiguration of this embodiment.

Assuming that the recognized character "±" 1102 is not the intended one, the operation of selecting the next candidate is performed with respect to the recognition engine 103, and a next candidate selection plate 1104 is displayed. At this time, next candidates are arranged on the next candidate selection plate 1104, starting from above in the descending order of total score in recognition evaluation according to the recognition engine 103 and the reference order, shown in FIGS. 13 and 14. In this case, the total score of the character "±" is 90 at the maximum, and the total score of the character "上" is 80 at the maximum. As a result, the character "±" is given as the first candidate, and the character "上" is given as the second candidate, on the next candidate selection plate 1104.

In this situation, suppose the user has selected the second candidate, the character 1103 "上", as the target character. At this time, the recognition front end section 102 transmits the reference stroke number 2, used when the character "上" was extracted as the candidate, from the recognition engine 103 to the frequency information updating section 106 through the selection operation section 104.

Figure 6:
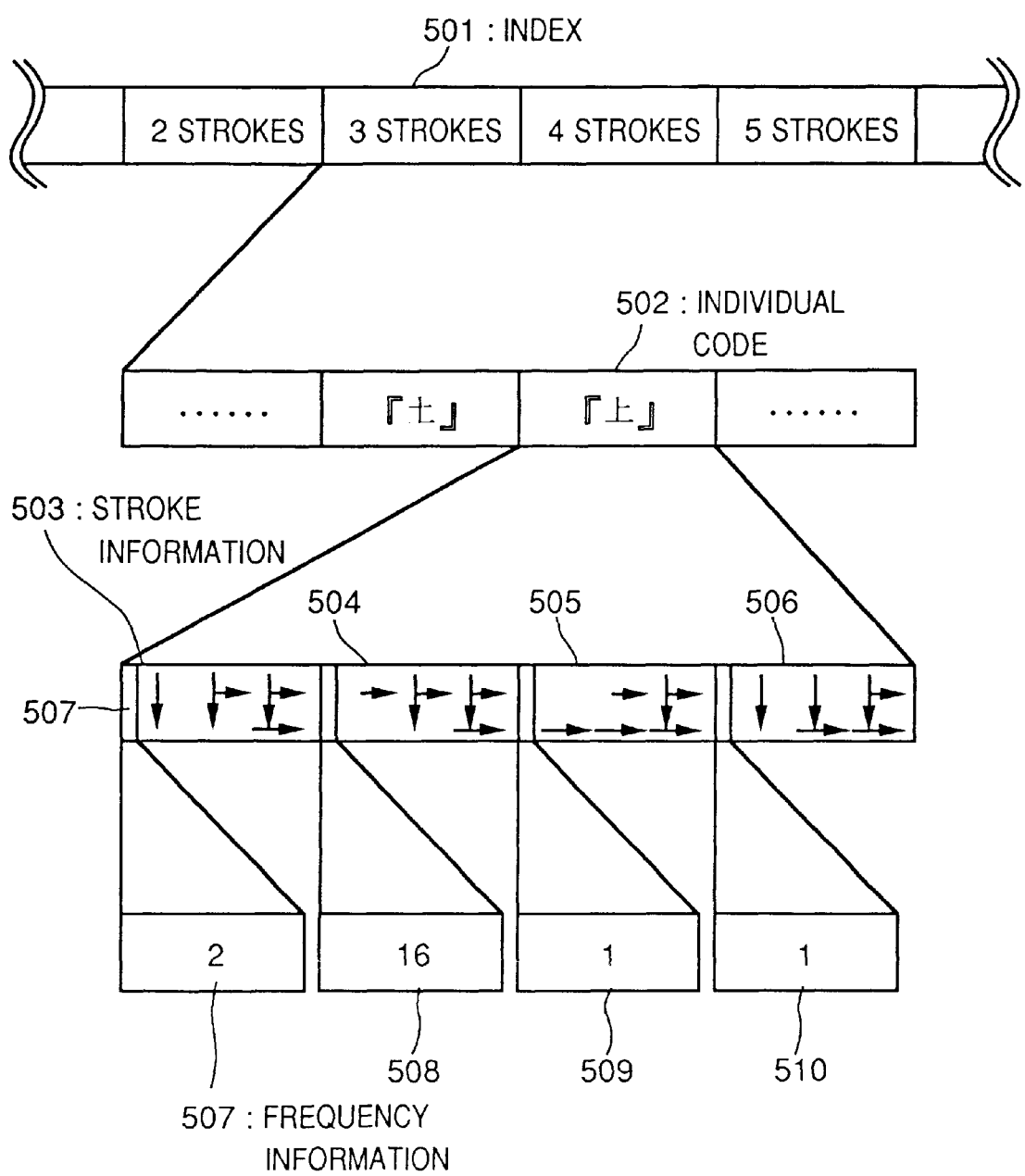
FIG. 6 is a diagram illustrating the dictionary reconfiguration operation of this embodiment.

In step 203, frequency information data 407 through 410 stored in the frequency information storage section of the dictionary, whose frequency information has been updated through repeated reference to the dictionary patterns, is read in, and the value of the frequency information 408 of the second reference stroke information 404, used when extracting the character selected as the candidate in the selection operation section 104, is incremented to update the value of the frequency information 508 to "16", as shown in FIG. 6.

Next, in step 205, the computation of the difference between the above-mentioned frequency information 508 and the remaining frequency information 507, 509 and 510 is executed. As a result, it is known that, of the stroke information groups 503 through 506 of FIG. 6, the stroke information 504 has the maximum of selection frequency, and that the difference in terms of frequency information between the stroke information 504 and those of 505 and 506 is 15. Next, in step 206, a judgment is made as to the difference in superiority of the above-mentioned frequency information. Here, the superiority-difference judgment is made as to whether "the difference is equal to or greater than 15 or not", which constitutes the criterion for judgment. When it is determined that there is no difference in superiority, the dictionary reconfiguration is terminated, and the system remains standby until the next recognition is executed.

Figure 7:
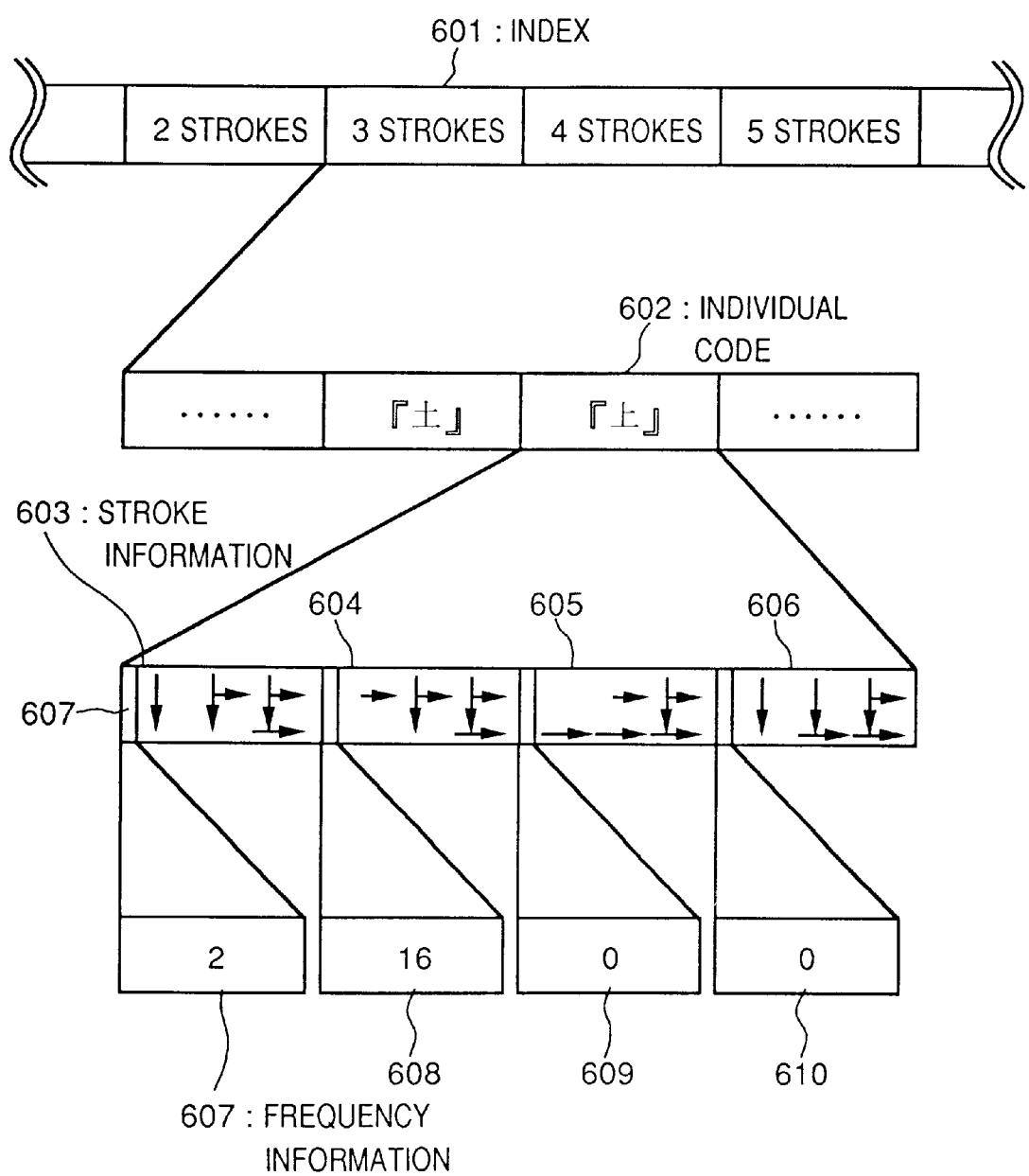
FIG. 7 is a diagram illustrating the dictionary reconfiguration operation of this embodiment.

In this embodiment, it is determined that there is a difference in superiority between the frequency information 508, 509 and 510, and, in step 207, the storage of dictionary reconfiguration information is executed, as shown in FIG. 7. Here, "0", which prompts for deletion at the time of dictionary reconfiguration, is stored in the frequency information storage sections 609 and 610 corresponding to stroke information 605 and 606, which have been judged to be of substantially no frequency of use from the results of the comparison computation in the frequency information section.

Next, in step 208, dictionary reconfiguration is performed with a set timing. Here, the term "set timing" means a timing which is set beforehand with respect to recognition dictionary reconfiguration, as shown in FIG. 9, when various setting operations of the handwriting recognition apparatus of this embodiment are executed.

Figure 9:
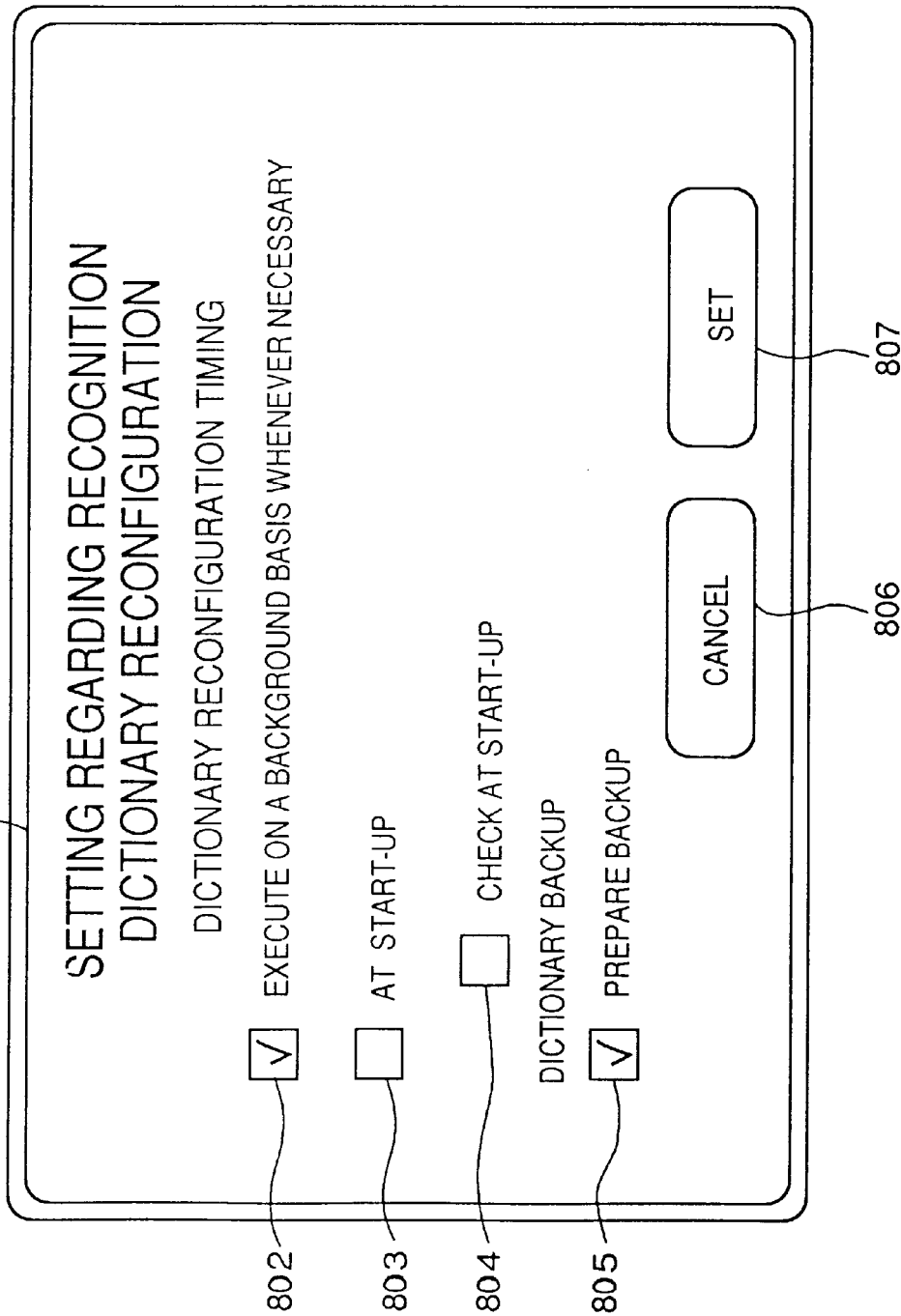
FIG. 9 is a diagram illustrating the dictionary reconfiguration operation of this embodiment.

In FIG. 9, numeral 801 indicates a pop-up window screen used when performing recognition dictionary reconfiguration; and numerals 802 and 803 indicate check boxes for selection regarding the timing with which the dictionary reconfiguration is to be executed. The check box 802 is used for setting when the dictionary reconfiguration is to be executed on a background basis in multitasking, and the check box 803 is used for selection to execute reconfiguration when this handwriting recognizing apparatus is started up. Numeral 804 indicates a check box for setting when the user is to make sure that the dictionary reconfiguration is to be executed at the start of the dictionary reconfiguration. Numeral 805 indicates a check box for setting as to whether backup is to be automatically prepared or not when performing dictionary reconfiguration. When this check box is selected, a former dictionary can always be preserved as a backup file prior to the starting of the dictionary reconfiguration, thereby making it possible for the backup file, which is relatively new, to be used as a dictionary again if the dictionary being used is irretrievably damaged for some reason or other. Numeral 806 indicates a push-button for canceling when some change has been made to the above check boxes. Numeral 807 indicates push-button for terminating the pop-up window for the setting.

In this embodiment, the setting for the reconfiguration of the dictionary is effected on a background basis whenever necessary as shown in FIG. 9, so that, in step 208 of FIG. 3, the dictionary reconfiguration is executed whenever necessary. Further, while in this embodiment the reconfiguration of the dictionary is effected whenever necessary or at start-up, there is no inconvenience in performing reconfiguration upon instruction by the user or when the system is shut down.

Figure 8:
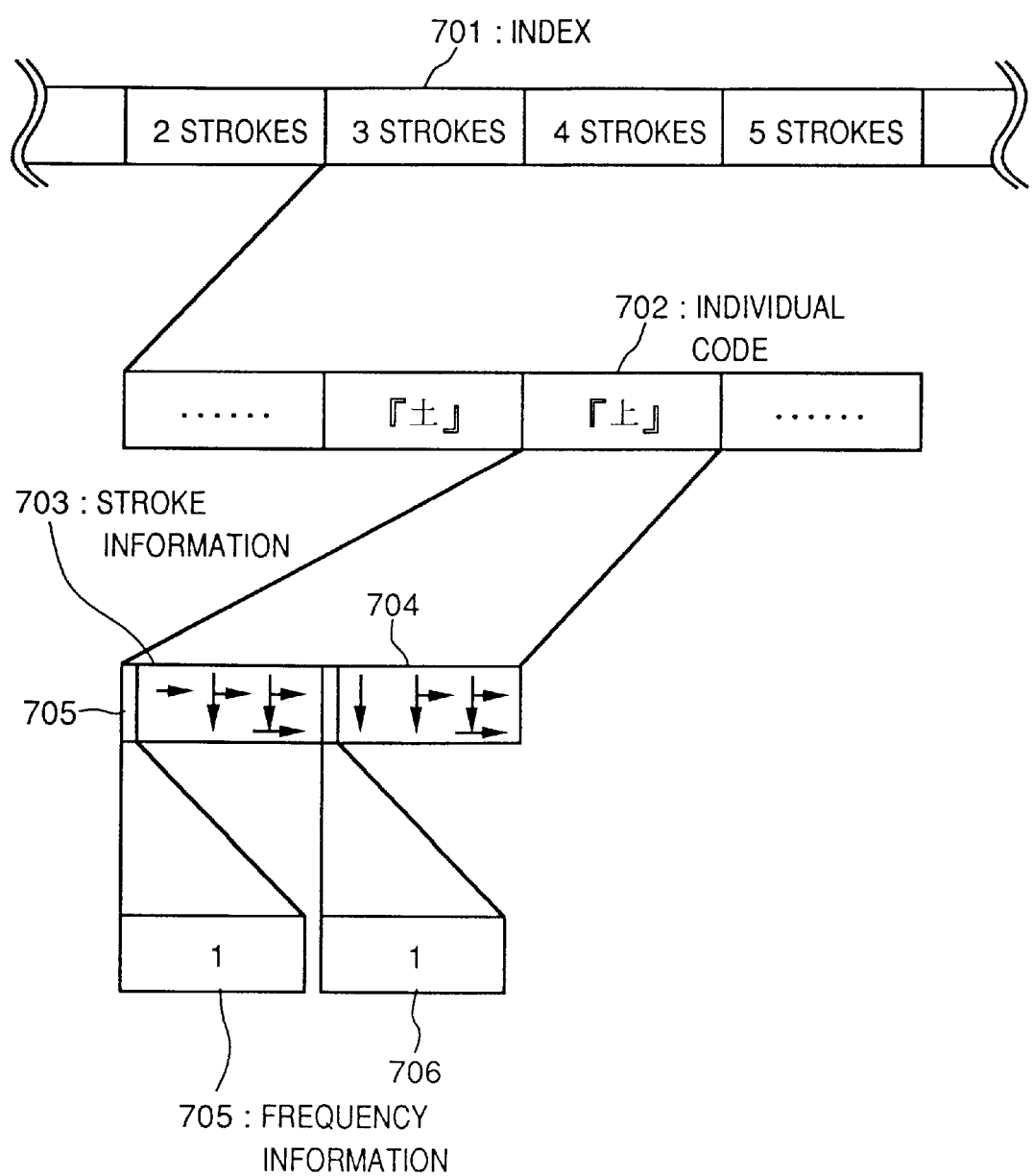
FIG. 8 is a diagram illustrating the dictionary reconfiguration operation of this embodiment.

FIG. 8 shows the results of dictionary reconfiguration executed. In FIG. 8, the stroke information of the maximum frequency, indicated at 604 in FIG. 7 is shifted to an initial portion 703 of the stroke information storage section of the character code "上" 702, whereby the recognition engine 103 can perform evaluation more reliably, starting from the stroke information 703 (604) of higher evaluation score, as shown in FIG. 15, and, as described above, the recognizing operation can be broken off more quickly when a cutting off operation is to be conducted as described above, thereby attaining an increase in processing speed. In FIG. 8, the stroke information 605 and 606, shown in FIG. 7, have been deleted. Further, the numerical data of the frequency information storage section in FIG. 8 has been updated to "1", which is the initial value.

As described above, according to this embodiment, in the handwriting recognizing apparatus, the user repeats handwriting recognition, thereby making it possible to positively reduce the capacity of the recognition dictionary to thereby effectively utilize the storage device.

Figure 10:
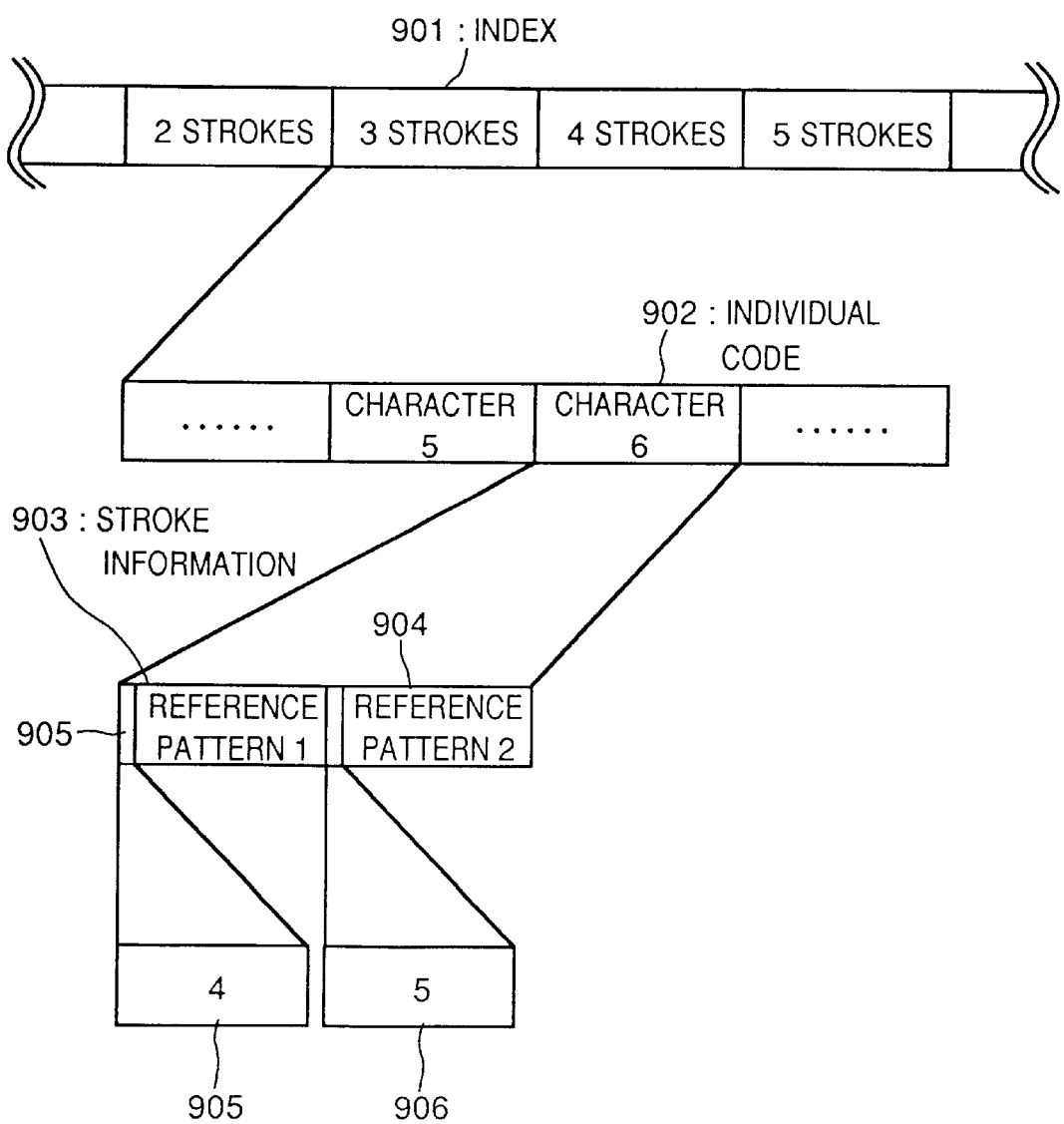
FIG. 10 is a diagram illustrating the dictionary reconfiguration operation of this embodiment through user registration.
Figure 11:
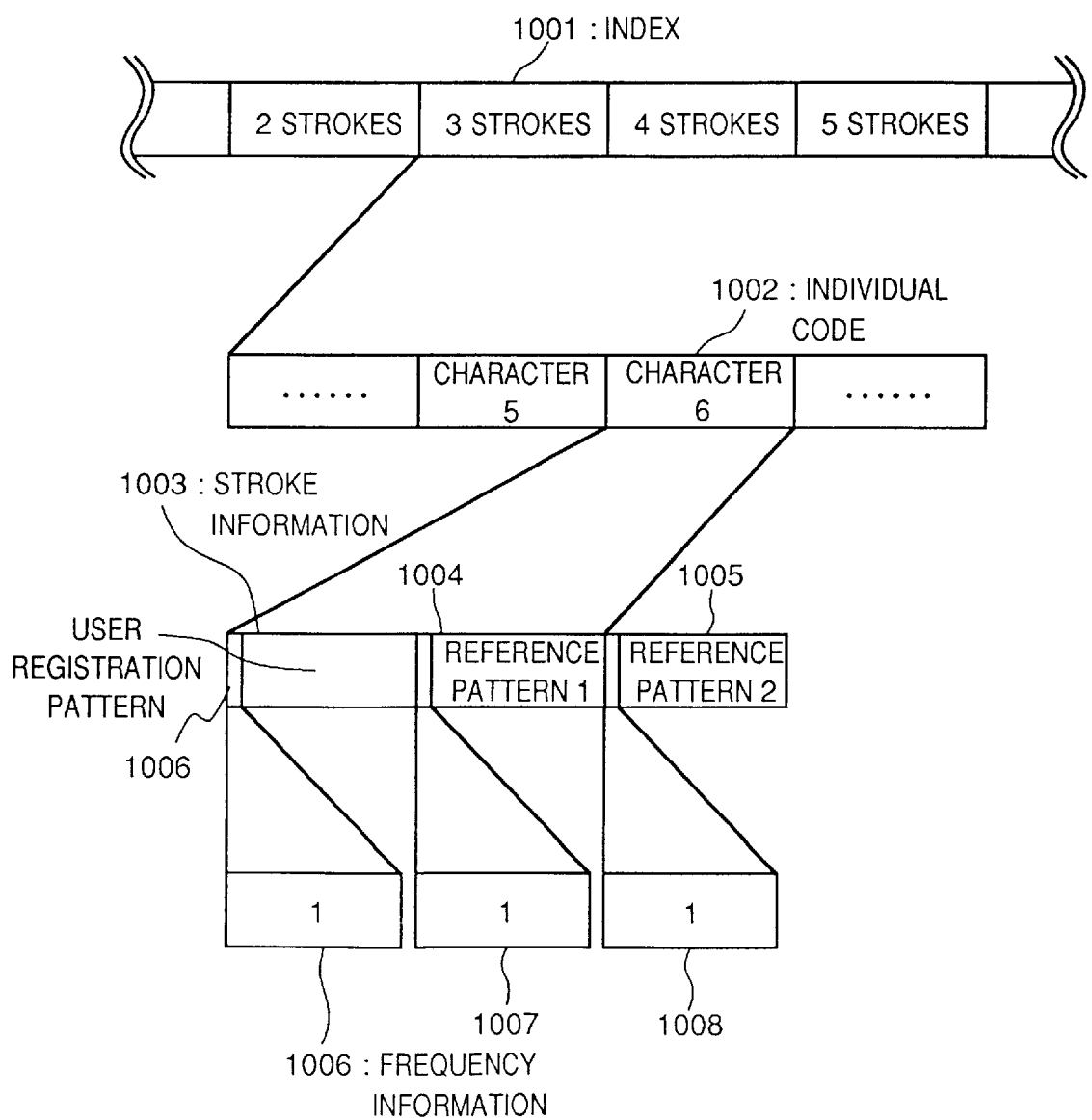
FIG. 11 is a diagram illustrating the dictionary reconfiguration operation of this embodiment through user registration.

Further, while in the above-described embodiment the reconfiguration is executed by using the recognition dictionary 105 as the main dictionary of the recognition engine 103 to thereby realize a reduction in the size of the recognition dictionary 105, it is also possible, as shown in FIGS. 10 and 11, to effect addition of a reference pattern of a high reference order to the main dictionary at the time of reconfiguration of the recognition dictionary, without providing a separate user registration dictionary as in the prior art, whereby user registration can be performed without involving an excessive increase in the dictionary size. Further, it goes without saying that, in this case also, a difference in superiority is generated in the frequency information due to the addition of the user registration pattern, thereby making it possible, in some cases, to effect a reduction in size due to the dictionary reconfiguration.

Further, while in the above embodiment the difference in frequency information is compared with a particular value to thereby obtain a judgment material when executing dictionary reconfiguration, it is also possible, when updating the corresponding values of a plurality of reference patterns, to update the selection information only after checking whether it is a pattern that is repeatedly referred to even after a predetermined period of time has elapsed, whereby, even in the case of a reference pattern that is not used by a particular user, an appropriate processing is possible even with respect to a case in which the frequency information has temporarily increased through input by some person other than the user, thereby enabling the user to reconfigure the dictionary in an appropriate manner which is more preferable to the user. Thus, the value corresponding to the reference pattern is not restricted to frequency information. For example, by using a typical value in some form or other for optimization of the recognition engine and the recognition dictionary, it is possible to perform an appropriate recognition dictionary optimization.

Example of User Registration

Figure 16:
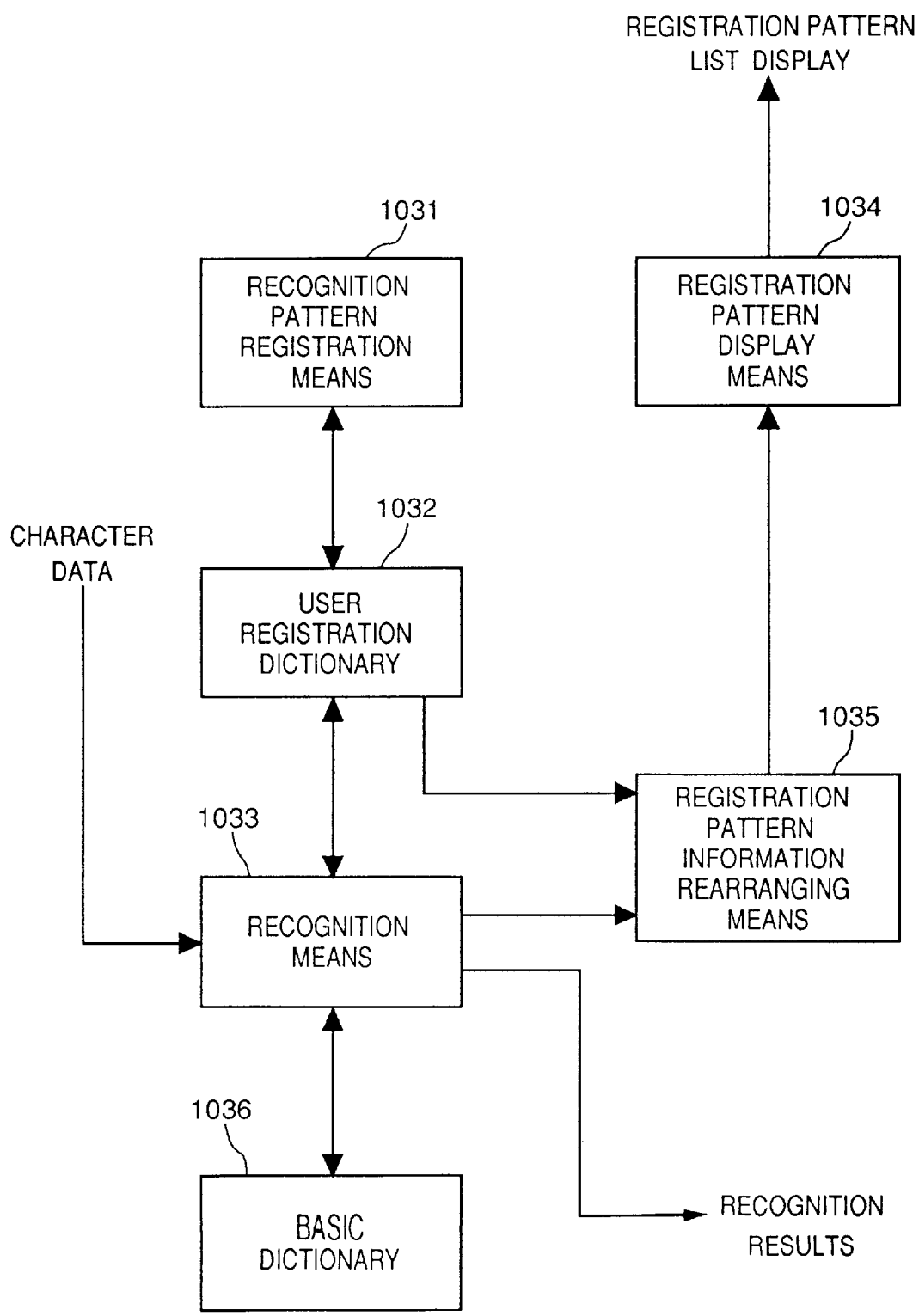
FIG. 16 is a block diagram showing a system configuration of the handwritten character recognizing apparatus of this embodiment in connection with user registration.

FIG. 16 is a block diagram showing the system configuration of the handwritten character recognizing apparatus of this embodiment in connection with user registration.

Figure 17:
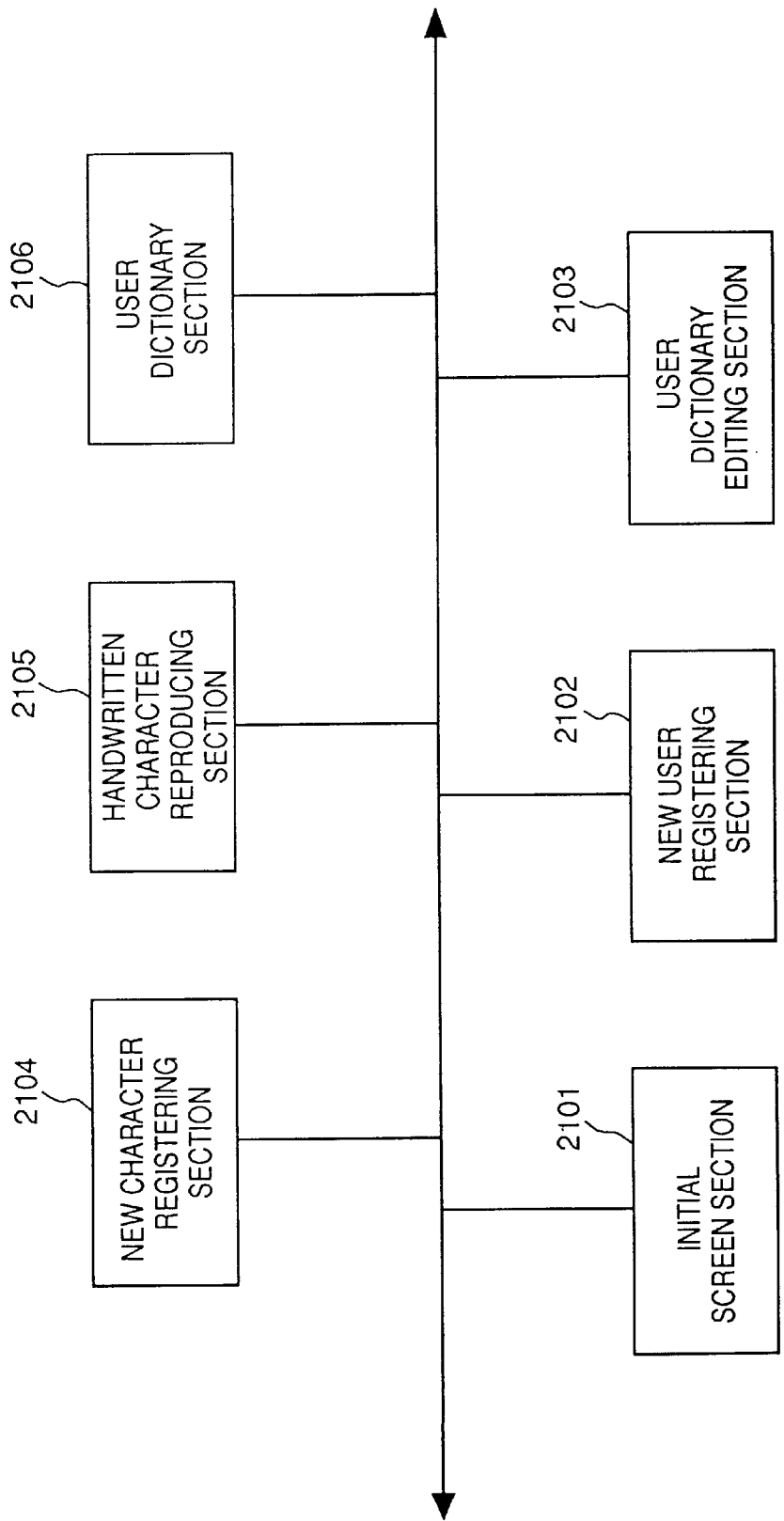
FIG. 17 is a schematic diagram illustrating a user registration application of this embodiment.

In FIG. 16, numeral 1031 indicates a recognition pattern registration means, which, in FIG. 17, constitutes a new character registering section 2104. Numeral 1032 in FIG. 16 indicates a user registration dictionary to which this user registration application is applied. Numeral 1033 indicates a recognition means which performs recognition by using the dictionary registered through this user registration application. The recognition is effected by a conventionally available algorithm or the like, and the results of recognition are output to the exterior. Numeral 1036 indicates a basic dictionary, in which character data, registered beforehand in a standard way of writing, is stored. The recognition means 1033 uses both the basic dictionary 1036 and the user registration dictionary 1032 and outputs the recognition results. When a command to display a registration pattern list is given from outside, the data of the user registration dictionary 1032 is transmitted to a registration pattern information rearranging means 1035. In the registration pattern information rearranging means 1035, a display command is supplied to a registration pattern display means 1034 in accordance with the registration pattern information transmitted from the user registration dictionary 1032. The registration pattern display means 1034 displays a user registration pattern list as in a registered-character list display area 4102 of the display example shown in FIG. 37, in accordance with the command transmitted from the registration pattern information rearranging means 1035.

FIG. 17 is a block diagram illustrating the user registration application of this embodiment Numerals 2102 through 2106 indicate sections are functional elements of user registration in on-line character recognition. Roughly speaking, they comprise window application execution sections based on GUI (graphical user interface) and user dictionary sections. A list of registration patterns according to the number of strokes, which indicates the feature of this embodiment, is displayed by a user dictionary editing section 2103. In the following, an actual user registration will be described.

Figure 37:
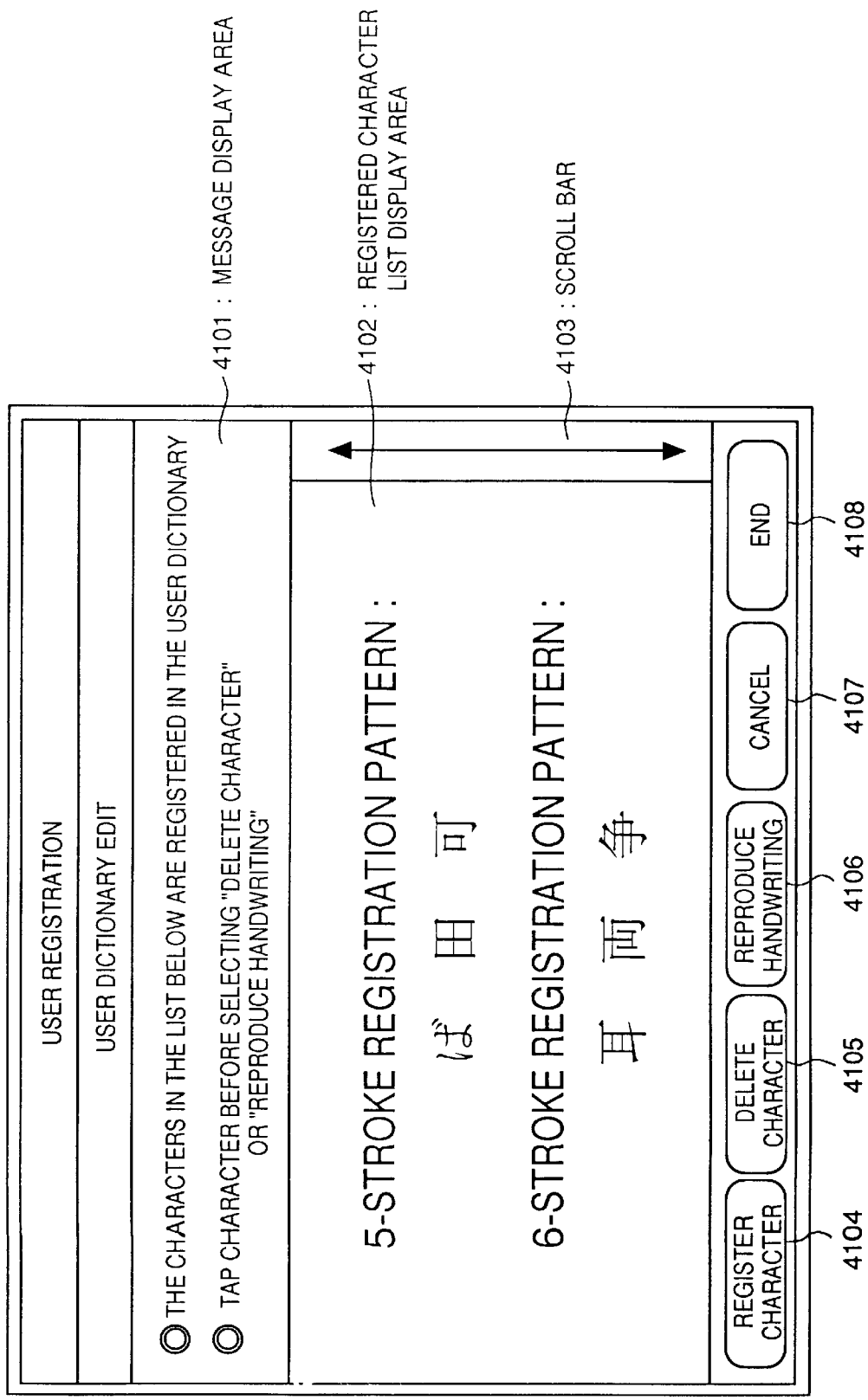
FIG. 37 is a diagram showing a user-registered character list display screen of this embodiment.

In an initial screen section 2101, a list of registered users is displayed so as to check the owners of the currently available user dictionaries. Another function included is a function by which a command to effect transition to a mode for newly registering a user and a mode for editing the registered characters in the user dictionaries is given. In a new user registering section 2102, the registration of a new user is executed. In the user dictionary editing section 2103, a list of the characters in the user dictionaries are displayed, making it possible to give a command to effect deletion and handwriting reproduction with respect to individual characters. FIG. 37 shows such a list display. In this embodiment, when displaying this list, the user-registered character patterns are displayed in the order of the number of strokes. As can be seen from FIG. 37, the registered characters are displayed in the order of the numbers of strokes, as 5-stroke character, 6-stroke character, and so on.

Also included is a command to newly register a character in the user's handwriting. In a new character registering section 2104, the character registration instructed in the user dictionary editing section 2103 is executed. In a handwritten character reproducing section 2105, the registered character designated in the user dictionary editing section 2103 is re-drawn in the order of handwriting. A user dictionary section 2106 is a section storing registered character information in order to realize these functions. Here, a plurality of users own their respective, different dictionaries.

Figure 18:
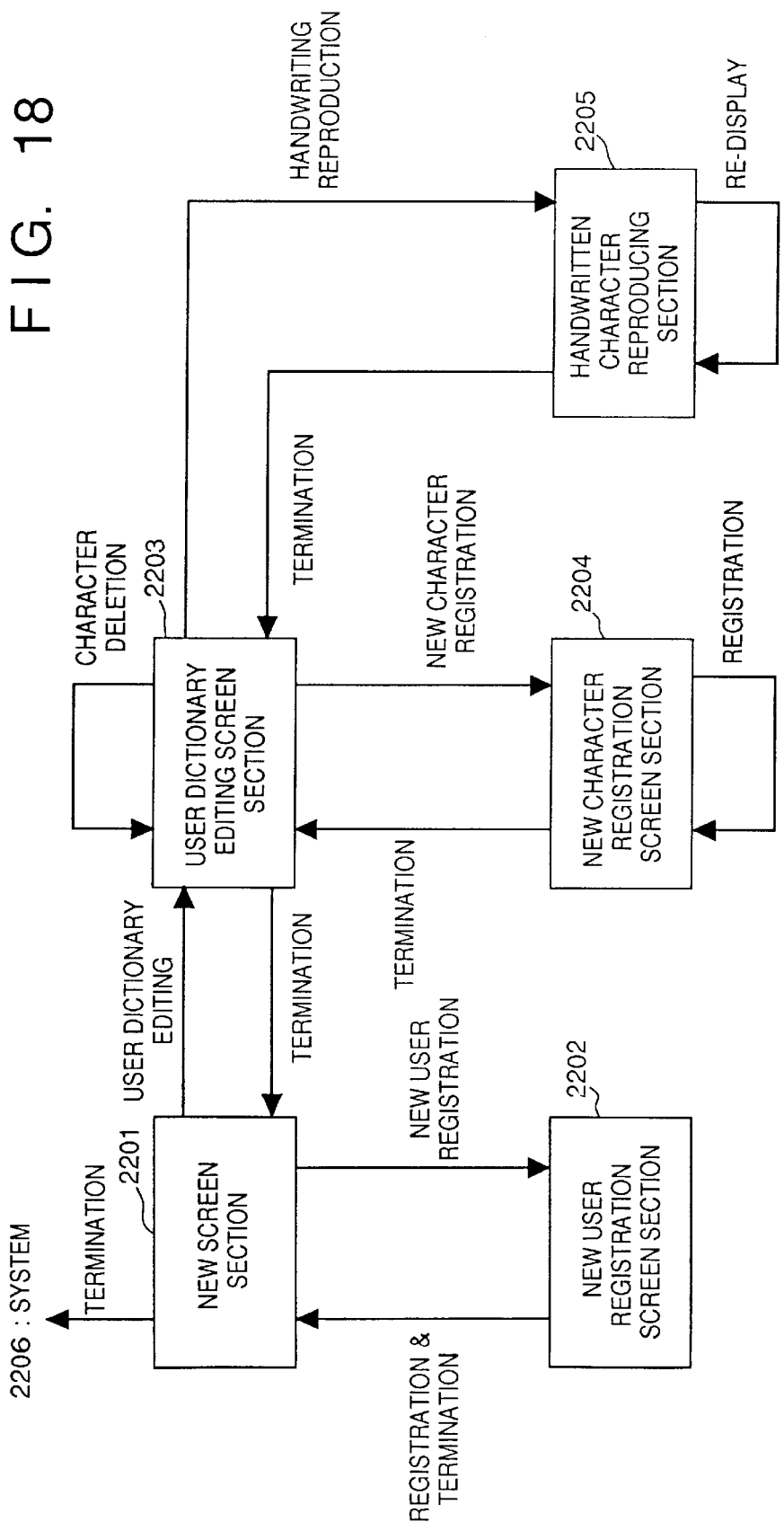
FIG. 18 is a window condition transition chart regarding the user registration of this embodiment.

FIG. 18 is a window condition transition chart of user registration application.

Numerals 2201 through 2205 indicate windows for executing the above-described functions. System 2206 is a section to which the control is returned when this user registration application is terminated. The arrows in the drawing indicate the control command flow by push-button control through the windows. In the following, this control flow and window transition will be described.

When a "new user registration" command is designated in a new screen section 2201, a new user registration screen section 2202 appears in the form of a pop-up window. When a "registration & completion" command is designated in the new user registration screen section 2202, this pop-up window is erased, and the control returns to the new screen section 2201 again. When the "user dictionary editing" command is designated in the new screen section 2201, the new screen section 2201 is erased, and a user dictionary editing screen section 2203 appears. In this condition, when the "new character registration" command is designated, a new character registration screen section 2204 appears in the form of a pop-up window. This character registering operation through the window can be repeatedly executed as long as the "completion" command is not designated.

When, after the character registration, "completion" is designated, the new character registration screen section 2204 is erased, and the control procedure moves to the user dictionary editing screen section 2203. The "character deletion" command of this user dictionary editing screen section 2203 can also be executed a plurality of times. When the "handwriting reproduction" command is further designated, a handwritten character reproducing section 2205 appears in the form of a pop-up window. Simultaneously with the display of the window, the reproduction starts. The display can be repeated by a "re-display" command. Upon the designation of the "completion" command, the window of the handwritten character reproducing section 2205 is erased, and the control is returned to the user dictionary editing screen section 2203. When the "completion" command is designated in the user dictionary editing screen section 2203, it erases its own window, and displays it again in the new screen section 2201. Therefore, it is only when the "completion" command is designated in the initial screen section 2201 that the user registration application can be completed.

As described above, the number of windows is two when the pop-up windows of the screen sections 2202, 2204 and 2205 are displayed. When the window of the screen section 2201 or 2203 is displayed, the number of windows is one.

Next, the functional details and the process flow in each screen section will be described with reference to FIGS. 19 through 48.

Figure 19:
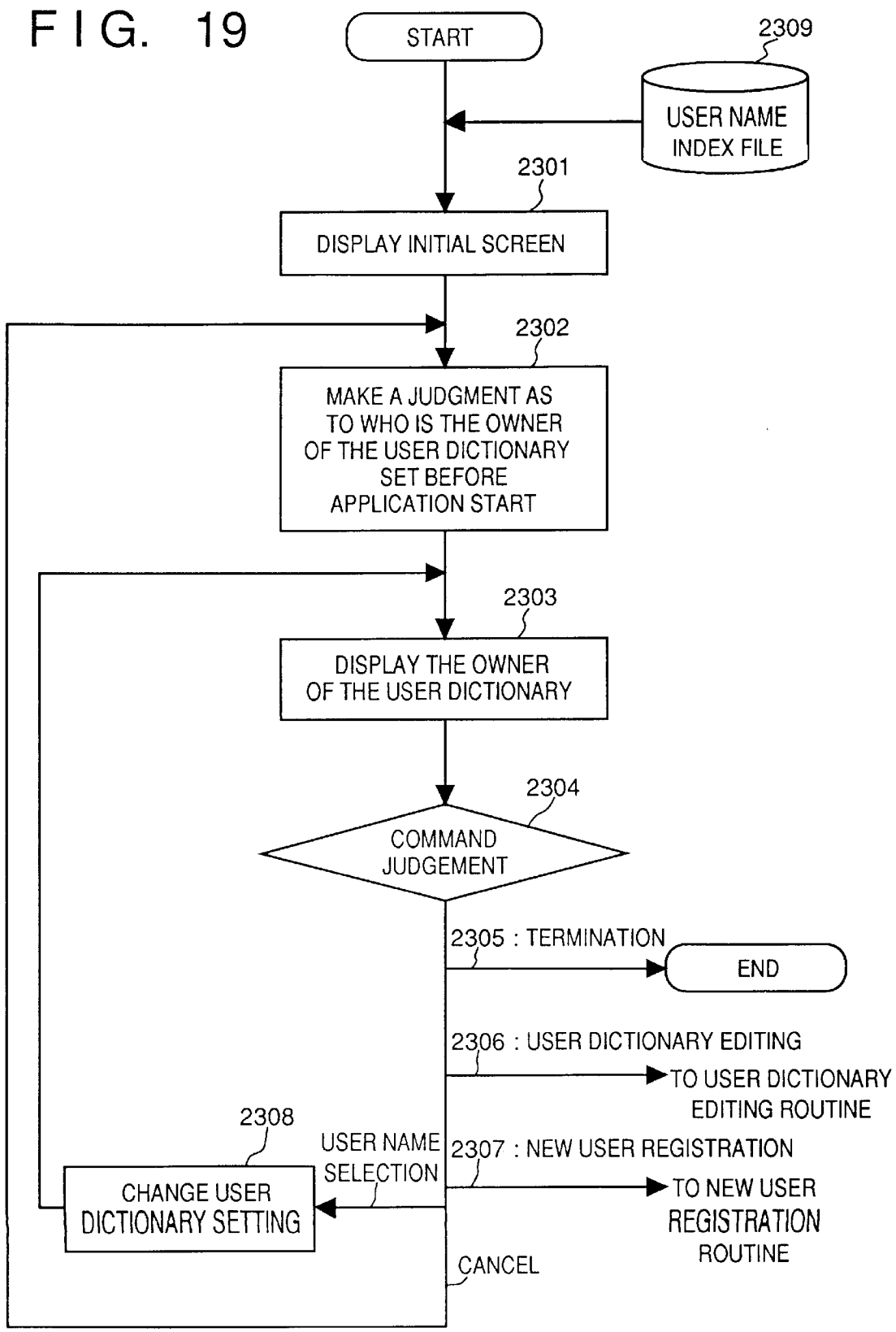
FIG. 19 is a flowchart showing an entire user registration process of this embodiment.

First, the process flow in the initial screen section will be described with reference to the flowchart of FIG. 19 and FIG. 33.

Figure 33:
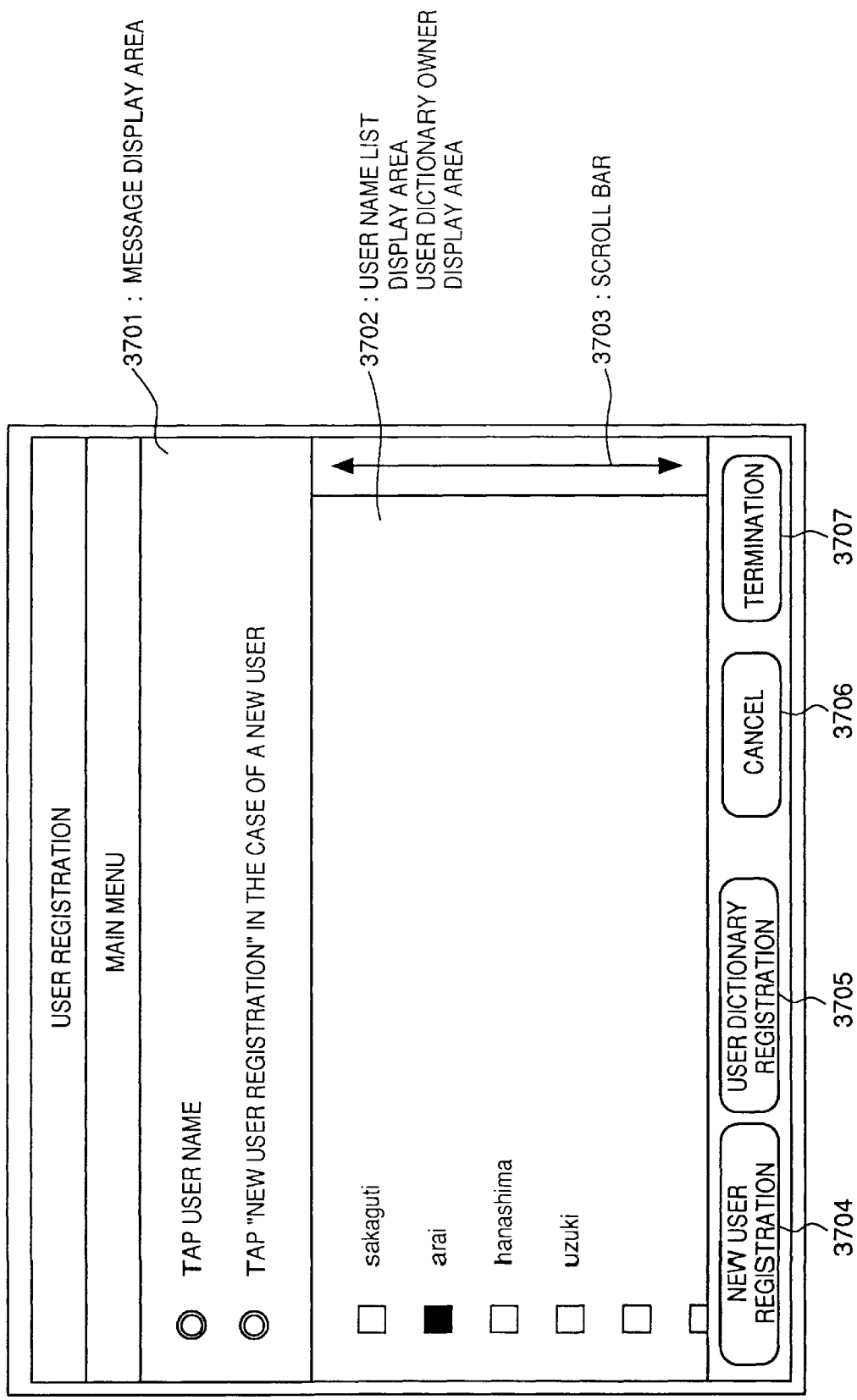
FIG. 33 is a diagram showing a user registration screen of this embodiment.

In FIG. 33, numeral 3701 indicates a message display area; numeral 3702 indicates a display area for a user name list and user dictionary owner display; numeral 3703 indicates a scroll bar used when the registered users cannot fit in the screen; and numerals 3704 through 3707 indicate pushbuttons that are capable of function calling through pen-tapping. This embodiment uses a device consisting of a liquid crystal and a coordinate input device using a pen which are formed into an integral unit. The device may be replaced by one comprising a CRT and a coordinate input device. In that case, the pen-tapping is replaced by clicking of a mouse switch.

When the user registration application is started, a window is prepared in step 2301. At this time, registered user names are read from an index file 2309. The index file 2309 is a file having a structure as shown in FIG. 39. It is a file that allows reading and writing. The window prepared is as shown in FIG. 33. In step 2302, a judgment is made as to the owner of the user set in the system. When the owner has been determined, the name of the user who is the owner of the user dictionary of the user name display area 3702 is marked in step 2303. For example, in the case of FIG. 33, the user whose name is "arai" is the owner. When the procedure has reached this stage, the system is in a standby state in which a command designation by the user is waited for (step 304).

When the user name is selected directly by a pointing device, such as a pen, change of the user dictionary owner is required by the system in step 2308 to change the setting. The operations by other pushbutton commands are as follows: when the "user dictionary edit" button 3705 is designated, a branch 2306 is selected, and the control moves to a user dictionary editing routine. When the "new user registration" button 3704 is designated, a branch 2307 is selected, and the control moves to the new user registration routine. When the "cancel" button 3706 is designated, the user dictionary setting change by user name section, which has been conducted, is nullified, and the user dictionary setting is restored to the condition prior to the application start. When the "termination" button 3707 is designated, a branch 2305 is selected, and this user registration application is terminated, the control being returned to the system.

Figure 20:
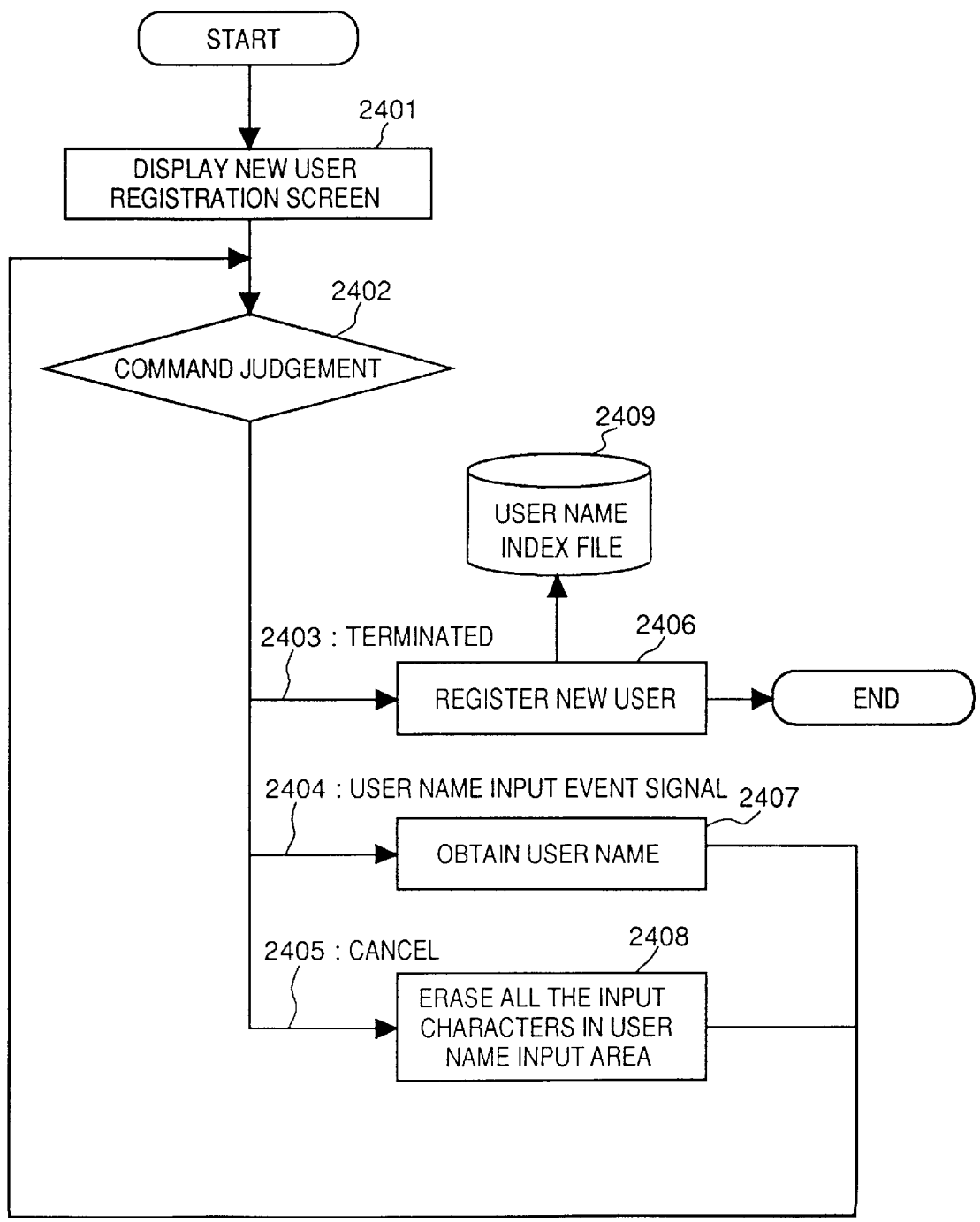
FIG. 20 is a flowchart showing a new user registration process of this embodiment.

Next, the process flow in the new user registration screen section will be described with reference to the flowchart of FIG. 20 and FIG. 34.

Figure 34:
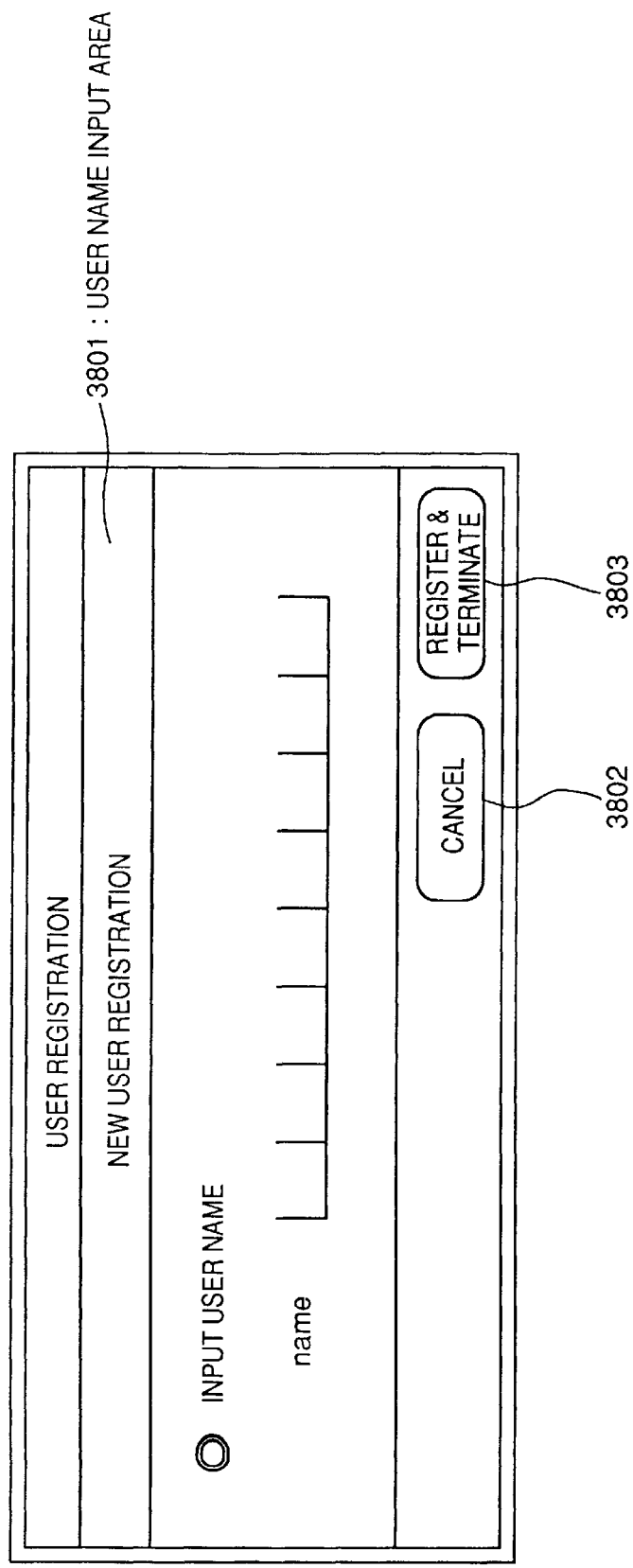
FIG. 34 is a diagram showing a new user registration screen of this embodiment.

In FIG. 34, numeral 3801 indicates a user name input area for inputting user names; numeral 3802 indicates a function button for canceling user name input; and numeral 3803 indicates a function button for registering the input user name and terminating this window.

When a "new user registration" command is designated in the initial screen (FIG. 33), a pop-up window as shown in FIG. 34 is displayed in step 2401. After this, the system goes into a state in which a command designation by the user is waited for. When an event signal input through pen-down is detected in the user name input area 3801, a branch 2404 is selected, and an existing recognition routine is called up. By using this routine, a handwritten character drawn in the user name input area is subjected to on-line character recognition to convert the character data into a character code (step 2407). When there is a designation by the "register & terminate" button 3803, the user name which has been conversion-input to the user name input area is judged to be the new user name, and additionally registered in a user name index file 2409 (step 2406). After this, its own window is erased, and control is returned to the initial screen section again. On the other hand, when there is a designation by the "cancel" button command 3802, the characters input to the user name input area are all erased (step 2408), and the system goes into a state again in which a user name input command designation is waited for.

Next, the process flow in the user dictionary editing section will be described with reference to the flowchart of FIG. 21 and FIG. 37.

In FIG. 37, numeral 4101 indicates a message display area; numeral 4102 indicates a registered character list display area, which constitutes a feature of the present invention; numeral 4103 indicates a scroll bar by means of which a number of registered characters can be displayed; and numerals 4104 through 4108 indicate buttons for calling up functions through pen-tapping. As can be seen from FIG. 37, in the display in the area 4102, registered characters are displayed in the order of numbers of strokes.

When the "user dictionary editing" indicated at 3705 is designated in the initial screen (FIG. 33), the designated user dictionary is first copied and separately stored (step 2512). This step is taken so that the dictionary editing operation can be canceled. Next, the user dictionary is opened, and the character codes in the user dictionary are read into the buffer area (step 2502). Here, for one-to-one correspondence between the characters in the user dictionary and the displayed characters, a character code table is prepared (step 2601 in FIG. 22). For example, when eight characters are registered, a table as shown in FIG. 40 is prepared.

In FIG. 40, the area next to each character code is the area for storing the number of strokes of that character pattern. The reason for preparing this character code correspondence table is that, if there existed plurality of items of dictionary character data with respect to the same character code, a search of the data in the dictionary could not be executed uniquely with the character code information alone with respect to the character editing by the "delete" or "reproduce" command. The user dictionary edit screen as shown in FIG. 37 is displayed on the basis of this character code correspondence table (step 2503).

Figure 21:
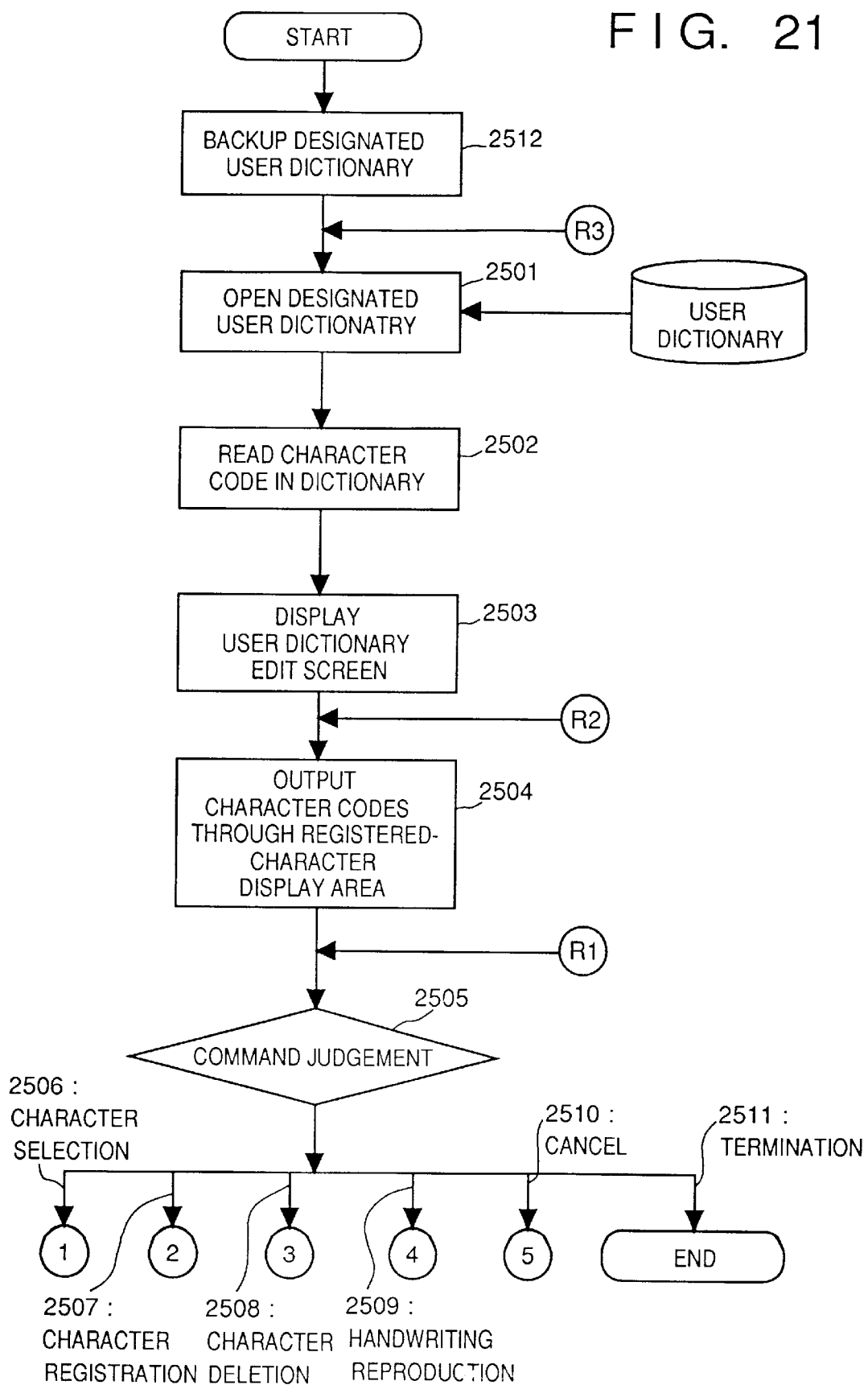
FIG. 21 is a flowchart showing a user dictionary editing process of this embodiment.
Figure 25:
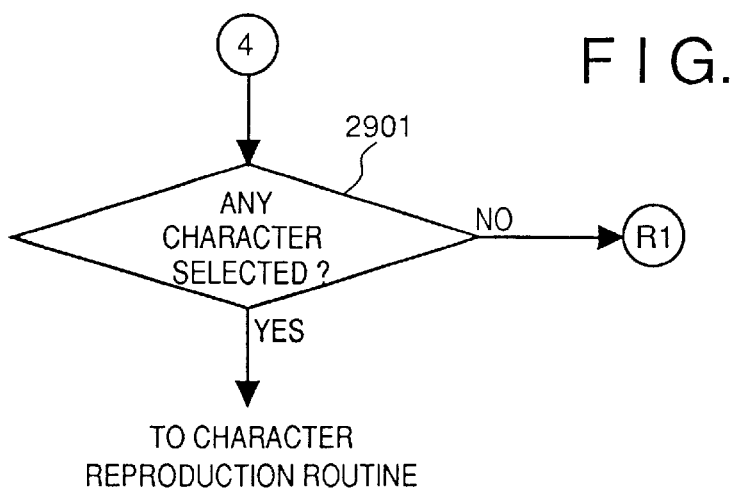
FIG. 25 is a flowchart showing a handwriting reproduction process of this embodiment.

After this, in step 2504 of FIG. 21, the character codes read-in the above step are displayed in the registered character list display area 4102. In this display, the characters are re-arranged by stroke order according to the values of the character pattern number-of-strokes area. As to the characters of the same number of strokes, they are arranged according to the order of dictionary storage. The numbers of strokes adopted are the correct ones as can be found in kanji dictionaries and the like. When registering a pattern by using the recognition pattern registering means 1031 of FIG. 16, the number of strokes of that pattern is counted, and the value thus obtained is stored in the number-of-strokes storage area of FIG. 40.

This re-arranging process will be described with reference to the flowchart of FIG. 41. In step 2021, the value of the retrieval number-of-strokes storage area K is initialized to zero. Then, in step 2022, the value of the retrieval number-of-strokes storage area K is incremented by 1. In this way, the number of strokes to be retrieved is sequentially incremented. Next, in step 2023, it is checked whether the value of the retrieval number-of-strokes storage area K is in excess of the maximum number of strokes in the user registration dictionary or not. If the value of K is in excess of the maximum number of strokes, no registration pattern is to be found through further search, so the registration pattern retrieval processing is terminated. If the value of K has not exceeded the maximum number of strokes yet, there still exists some registration patterns to be retrieved, so the procedure advances to step 2024. In step 2024, it is checked whether a pattern of a number of strokes corresponding to the value of the retrieval number-of-strokes storage area K exists in the user registration dictionary 1032 or not. If no such pattern exists, the procedure moves to step 2022 to retrieve the next number of strokes. If there is such a pattern, the procedure moves to step 2025 to extract that character.

In step 2025, a registered-character pattern of a number of strokes corresponding to the value of the retrieval number-of-strokes storage area K is searched for through the user registration dictionary 1032. That is, character patterns whose number of strokes in the number-of-strokes storage area of the user registration dictionary is the same as the value of K are extracted, and transmitted to the registered pattern display means 1034 to display a character pattern list 4102 as shown in FIG. 37. Suppose the contents of the user registration dictionary 1032 are as shown in FIG. 40. Assuming, in this condition, that the value of K is 5 and 5-stroke patterns are extracted, the characters displayed are: "ば", "田", and "可" as shown in FIG. 37 since the 5-stroke characters are "0×2450", "0×4544" and "0×3244" as can be seen from the diagram. Next, when the value of K is incremented to become 6 and 6-stroke patterns are extracted, the characters displayed are: "耳", "両", and "争" as shown in FIG. 37 since the 6-stroke characters are "0×3C2A", "0×4E3E" and "0×4168" as can be seen from the diagram.

Figure 41:
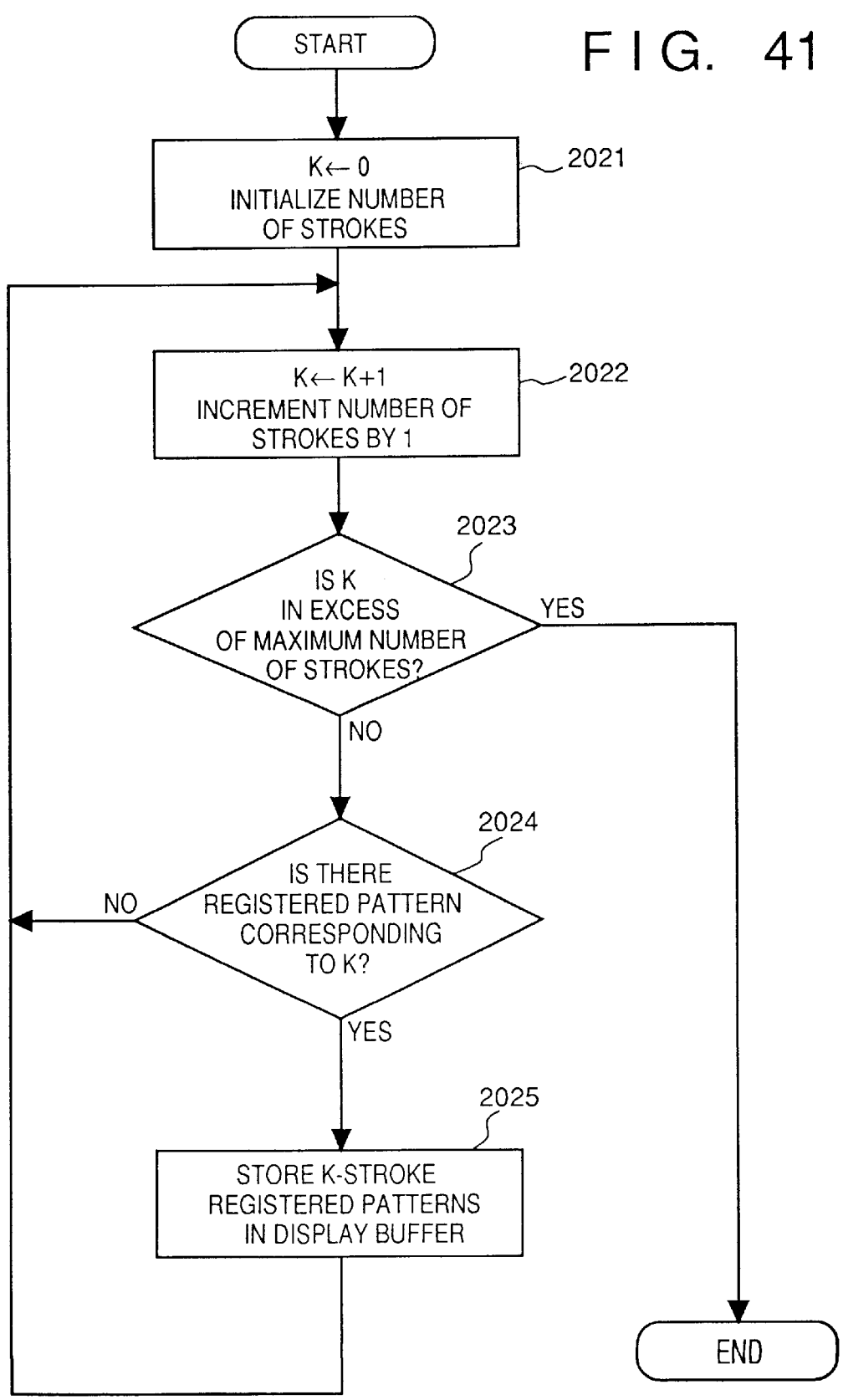
FIG. 41 is a flowchart showing an example of the registered-character pattern rearranging process of this embodiment.
Figure 42:
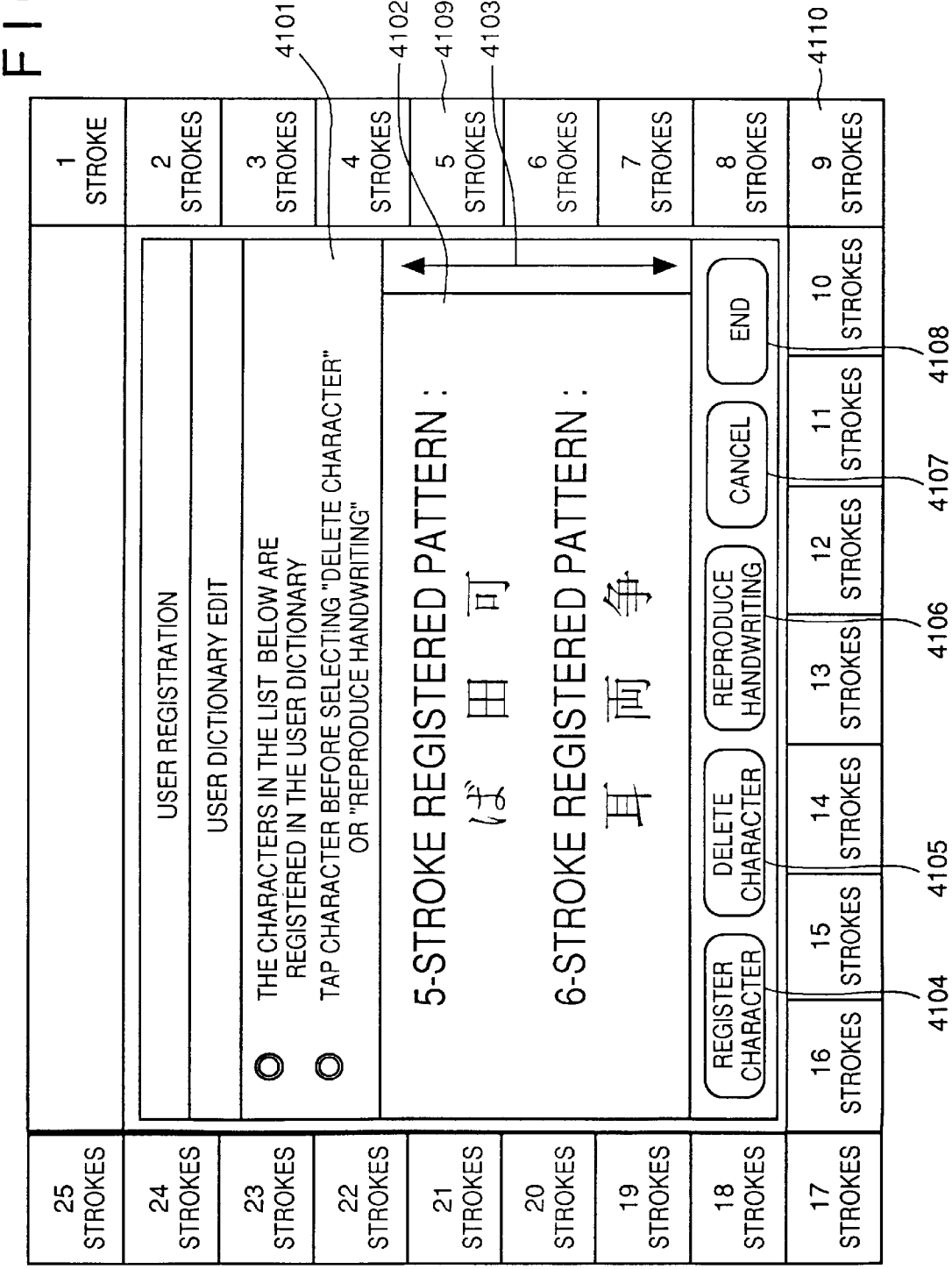
FIG. 42 is a diagram showing an example of the user-registered-character list display screen of this embodiment.

While in the flowchart of FIG. 41 the initial value of K in step 2021 was 0 and the search was started from the registered characters of 1 stroke, it is also possible for the initial value of K to be an arbitrary value. In that case, the search can be started from the registered-character patterns of (K+1) strokes and displayed. If the areas 4109 and 4110 in FIG. 42 are designated number-of-strokes areas and indicated by a pen, the search is started from the number of strokes designated, and the process is displayed. In FIG. 42, the area 4109 is a 5-stroke designation area. If this area is designated, the initial value of K in step 2021 is 4, and, from step 2022 onward, the search is conducted on the registered characters of 5 strokes or more, resulting in a display as indicated at 4102 in FIG. 42. Similarly, if the number-of-strokes designation area 4110 for 9 strokes is designated, the search is started from the registered character patterns of 9 strokes or more.

After this, the system goes into the state in which a command designation by the user is waited for (step 2505 of FIG. 21). If a signal generated through pen-down or the like is detected in the registered-character list display area, the character at the position where the pen-down was performed is selected (branch 2506). From positional information on the character thus selected, a display number in the character code table is obtained, and, from this display number, the place where the dictionary character data is actually stored is determined, thereby obtaining the dictionary character information to be edited. When the "register character" button command 4104 in FIG. 37 is selected, the branch 2507 is selected, and the control moves to a new character registration routine (step 2701 of FIG. 23).

Figure 26:
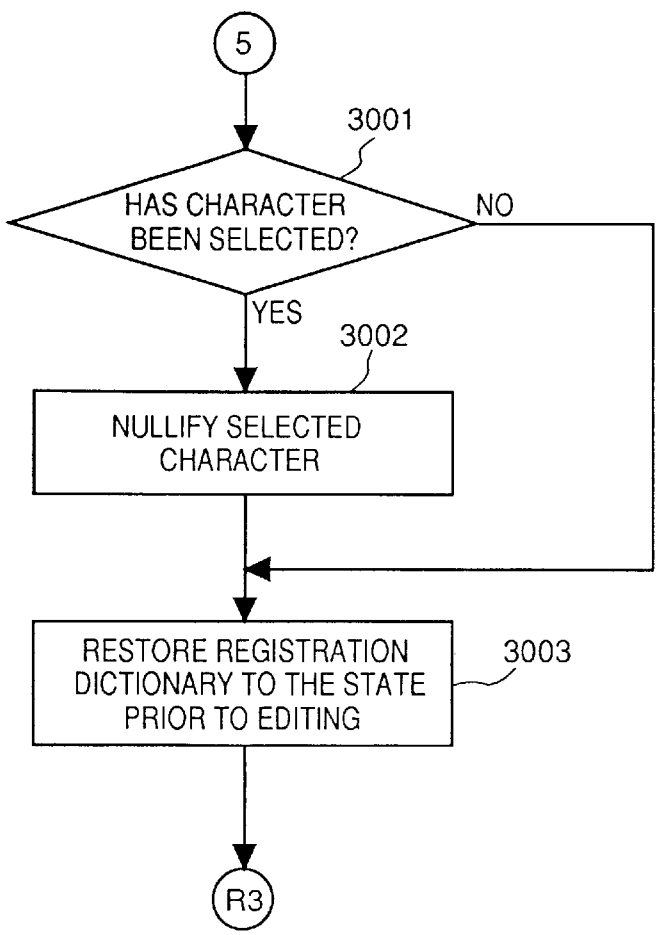
FIG. 26 is a flowchart showing a cancellation process of this embodiment.

When the "delete character" button command 4105 is designated, a branch 2508 is selected, and a judgment is made as to whether a character in the registered-character list display area has been selected or not (step 2801 of FIG. 26). If none has been selected, the procedure returns to the command designation waiting state of step 2505. If a character in the list has already been selected, the place in the dictionary data storage where the character to be deleted is stored is searched for by using the above-mentioned character code correspondence table. When the storage place is found, the dictionary character data stored in the actual user dictionary is deleted (step 2802). When the contents of the user dictionary are changed, the character code correspondence table is changed at the same time, and the character display in the registered-character list display area is updated (step 2504).

When the "reproduce handwriting" button 4106 is designated, a branch 2509 is selected. When a character has been selected in step 2901, the control procedure returns to the handwriting reproduction routine. When none has been selected yet, the system goes into a state in which a next character selection is waited for. When the "cancel" button command 4107 of FIG. 37 is designated, a branch 2501 is selected, and a judgment is made in step 3001 of FIG. 26 as to whether a character in the registered-character list display area has been selected or not. Any character that has been selected is then nullified (step 3002), and, if no character has been selected in the display, the contents of the registration dictionary are restored to the state prior to the starting of the dictionary edit window in step 3003, thereby enabling the edit operation to be started again. The "end" button command 4108 is used to erase this user dictionary edit window and to return the control to the initial screen section.

Figure 27:
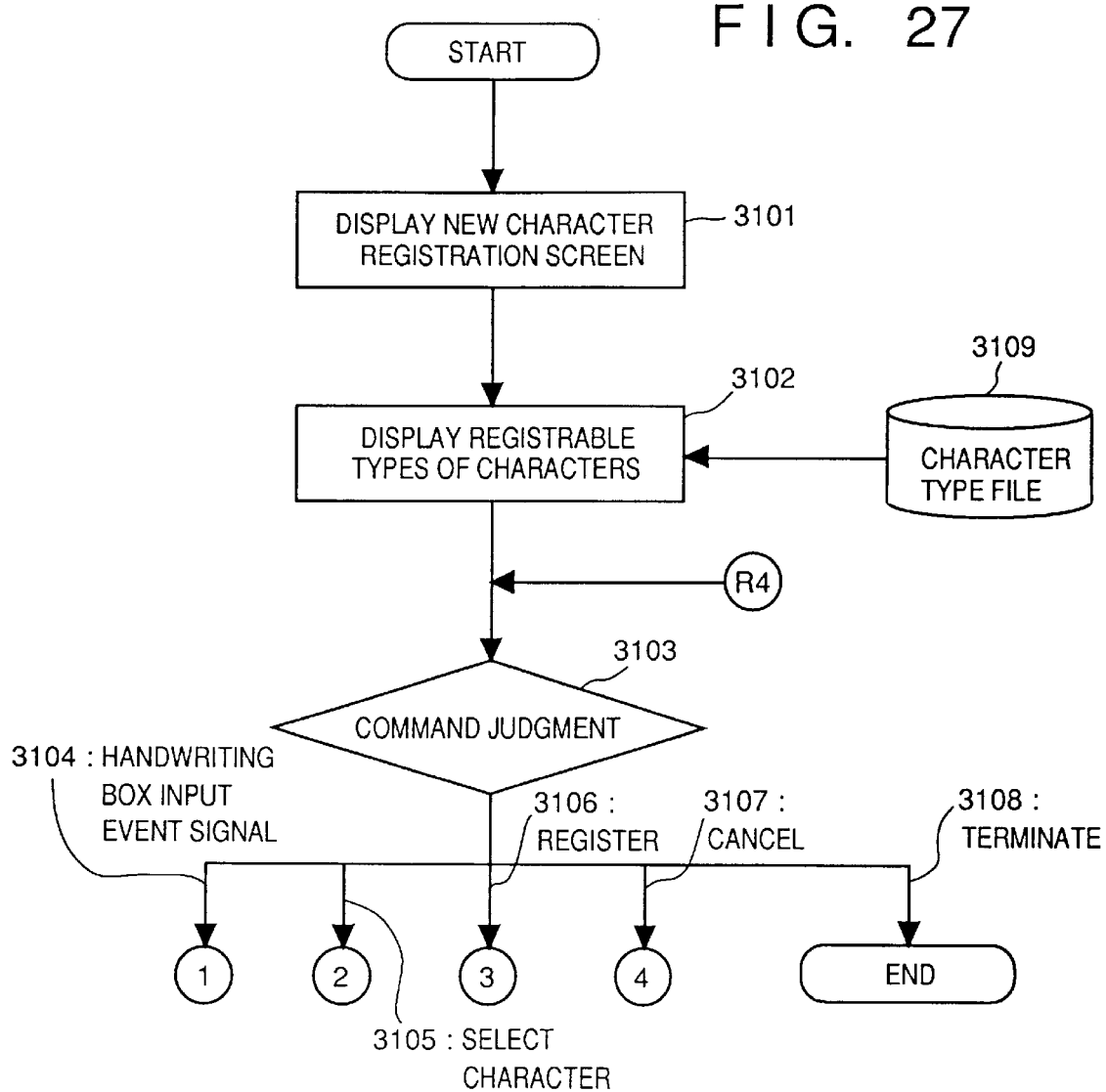
FIG. 27 is a flowchart showing a new character registration process of this embodiment.
Figure 28:
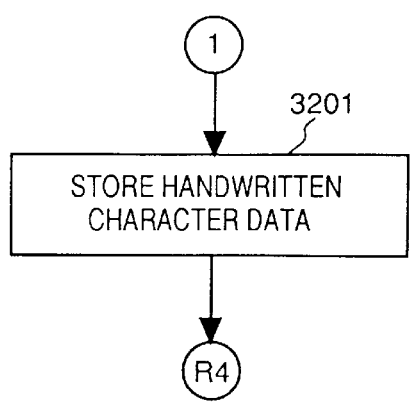
FIG. 28 is a flowchart showing a character handwriting data storage process of this embodiment.
Figure 29:
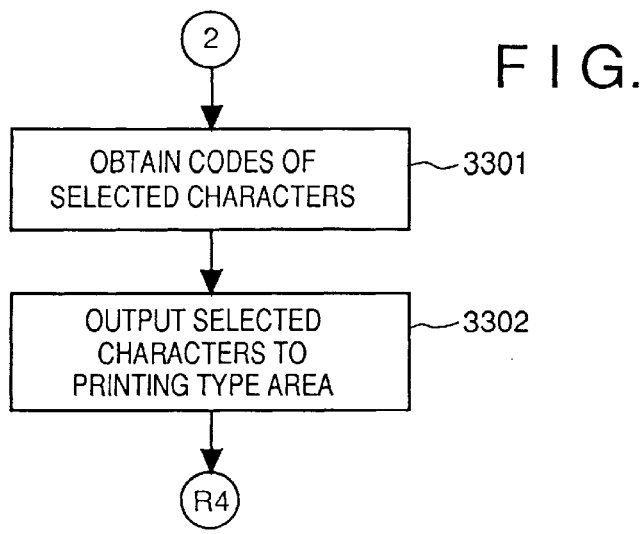
FIG. 29 is a flowchart showing a character selecting operation in the new character registration process.
Figure 30:
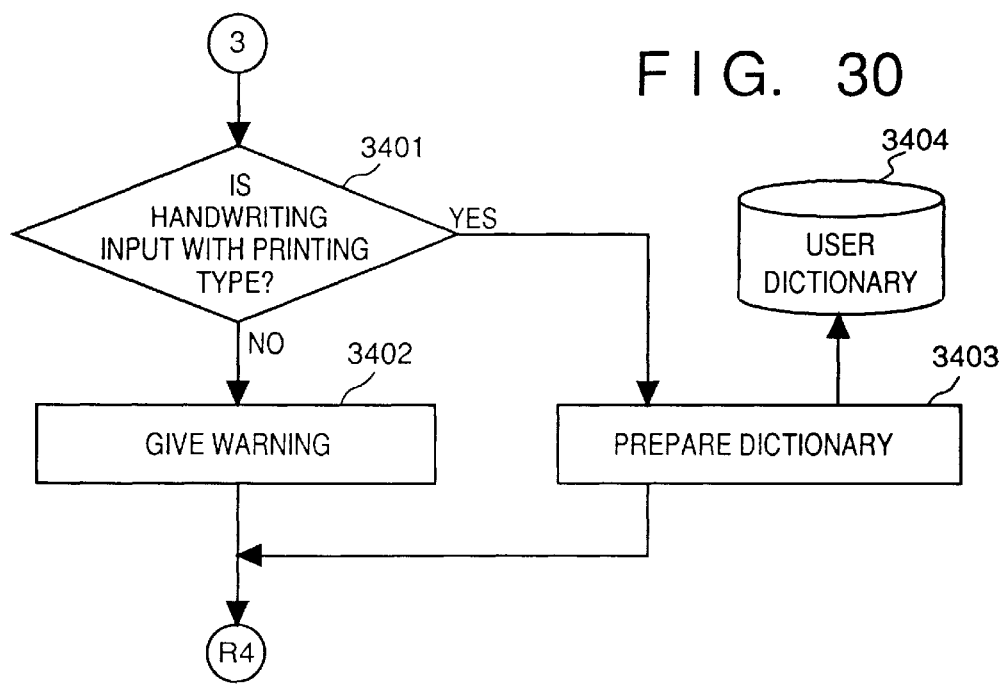
FIG. 30 is a flowchart showing a character registering operation in the new character registration process.

Next, the process flow in the new character registering section sill be described with reference to the flowchart of FIG. 27 and FIGS. 35 and 36.

Figure 35:
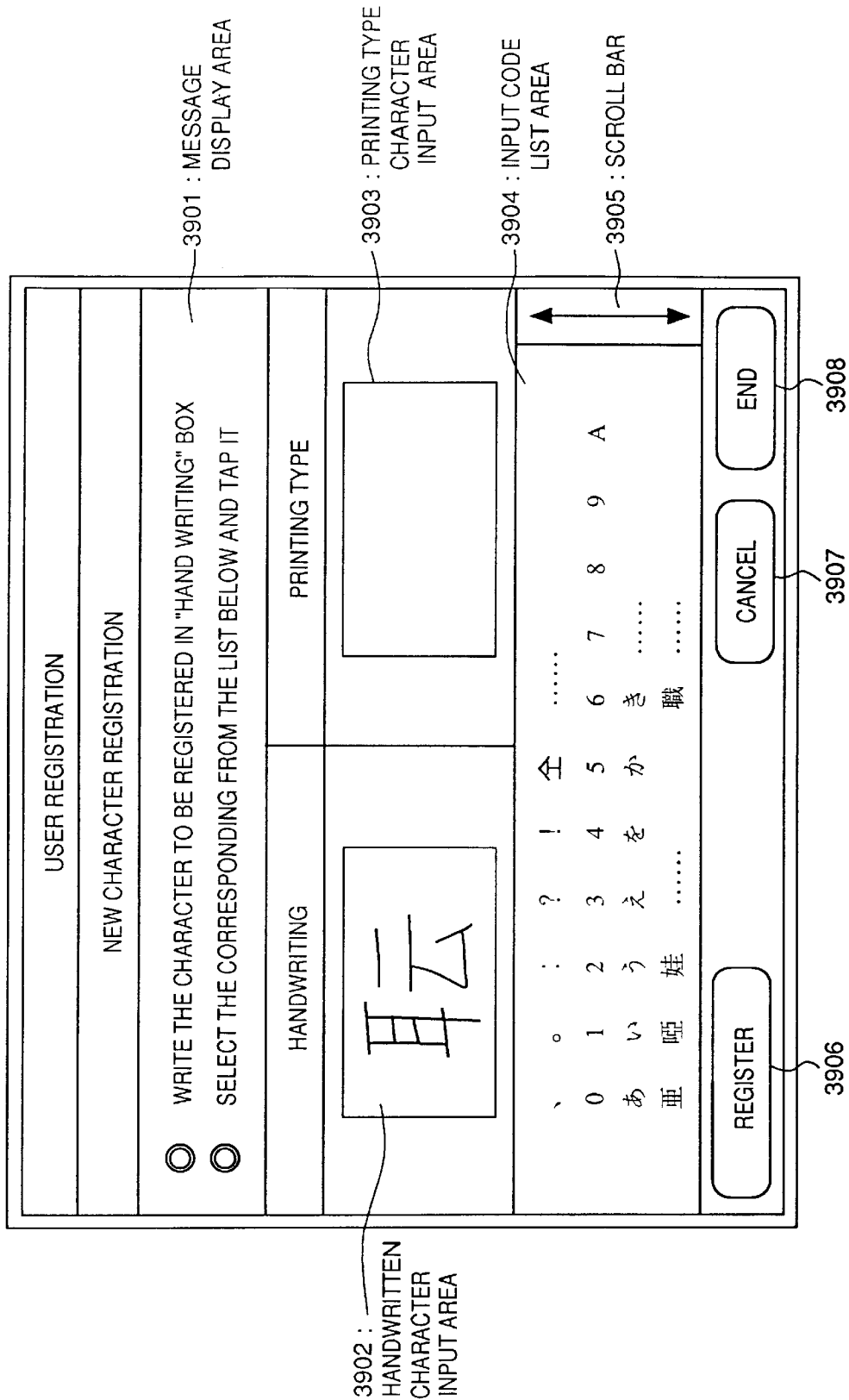
FIG. 35 is a diagram showing a new character registration screen prior to character selection of this embodiment.
Figure 36:
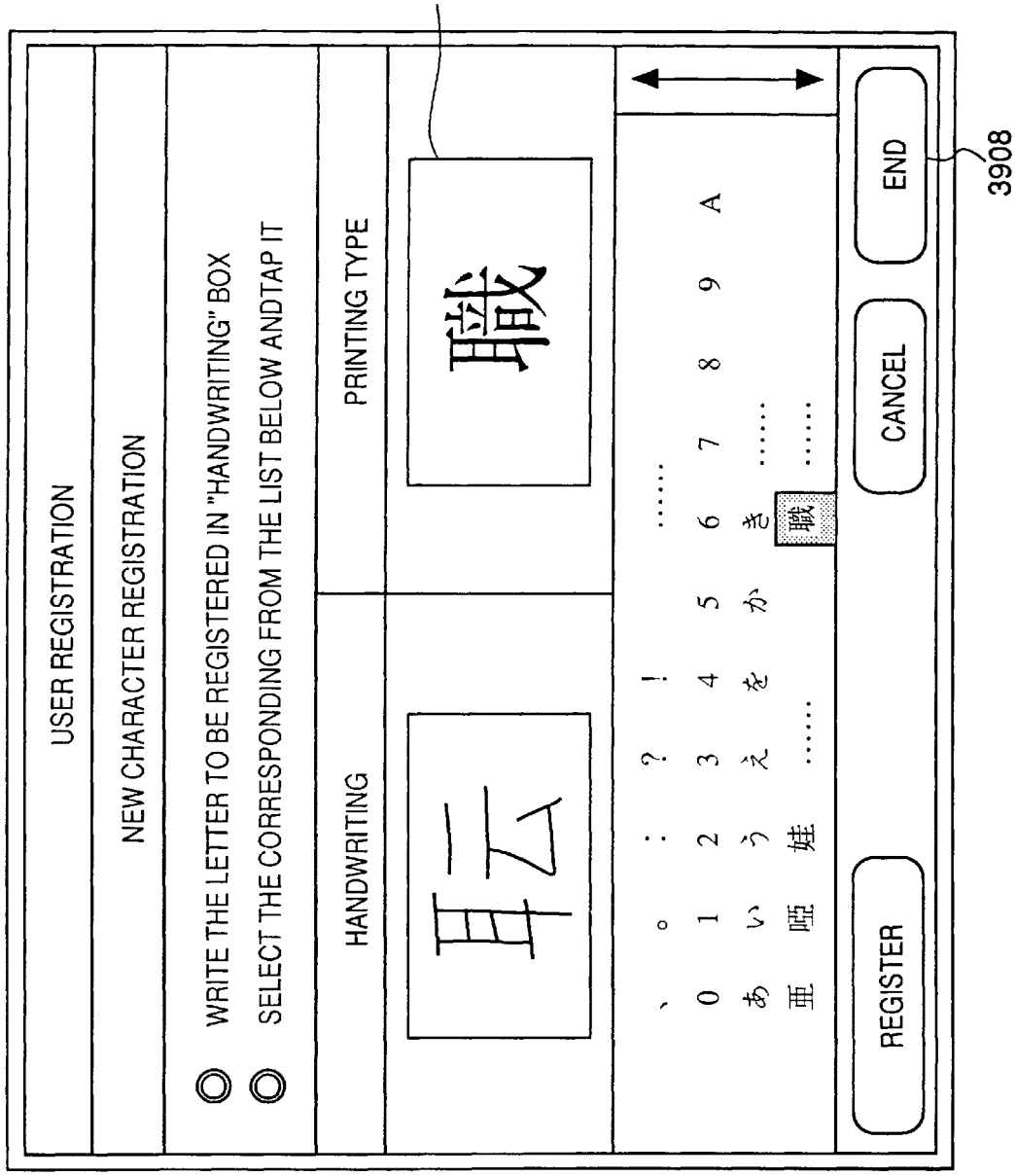
FIG. 36 is a diagram showing a new character registration screen after character selection of this embodiment.

In FIG. 35, numeral 3901 indicates a message display area; numeral 3902 indicates a handwritten character input area; numeral 3903 indicates a printing-type character input area; numeral 3904 indicates an input code list display area; numeral 3905 indicates a scroll bar which enables a plurality of character codes to be displayed; and numerals 3906 through 3908 indicate function call-up buttons based on pen-tapping.

In the user dictionary edit screen (FIG. 37), when the "register character" 4104 is designated, a framework of a screen as shown in FIG. 35 is formed, and displayed in the form of a pop-up window (step 3101). Here, the term "character registration" means the operation of allocating character data in the form of a handwriting peculiar to the user to corresponding character codes. Thus, the operation requires the provision of a data input section for obtaining data on the handwriting of the user and a corresponding character input section. In FIG. 35, the handwriting box 3902 constitutes the handwriting data input section, and the printing type box 3903 constitutes the character code input section. In FIG. 35, the area 3904, which is under the central portion of the screen, constitutes the area for the input code list for inputting character codes. Characters are selected from this area and input. Accordingly, it is necessary to display registrable characters in the input code list. For this purpose, a character type file 3109 for storing registrable types character is prepared beforehand. By the reading-in of this file, the registrable types of characters are displayed (step 3102). When this display has been completed, a command designation by the user is waited for (step 3103). When a pen-down signal input by the user is detected in the handwriting box 3902, a branch 3104 is selected, and the handwriting data is stored in the buffer area in the form of an aggregate of two-dimensional coordinate points (step 3201 of FIG. 28) and, at the same time, drawn in the handwriting box 3902.

In the case of FIG. 35, the user has written a simplified form of the character "職". To input the corresponding character code, a branch 3105 is selected by selecting the character from the input code list as described above, and the character code is stored in the buffer area to thereby obtain the character code (step 3301 of FIG. 29). Each character selected is displayed in an enlarged form in the printing type box 3903 (step 3302). When the "register" button command 3906 in FIG. 35 is designated, branch 3106 is selected, and it is checked whether both the handwritten character in the handwriting box 3902 and the character in the printing type box have been input or not (step 3401). When both have been input, the preparation of a recognition dictionary with respect to that character is started (step 3403).

The preparation of the recognition dictionary is executed by forming a standard pattern from the character data, which is effected by utilizing a well-known technique. This standard pattern is prepared in the user dictionary 3404, or added thereto. If the input of the handwriting data and character code has been effected to only an insufficient degree, a warning is given (step 3402), and the process is repeated so that both the handwriting data on the character to be registered and the corresponding character code may be input. When the "cancel" button command 3907 is designated, a branch 3107 is selected, and the character data and the character code input to the handwriting box 3902 and the printing type box 3903 are nullified (step 3501 in FIG. 31) to thereby make it possible to effect the input again. In FIG. 36, the character "職" has been selected from the character code list and input. When the "end" button command is designated, a branch 3108 is selected, and this new character registration window is erased to return the control to the user dictionary editing section.

Figure 32:
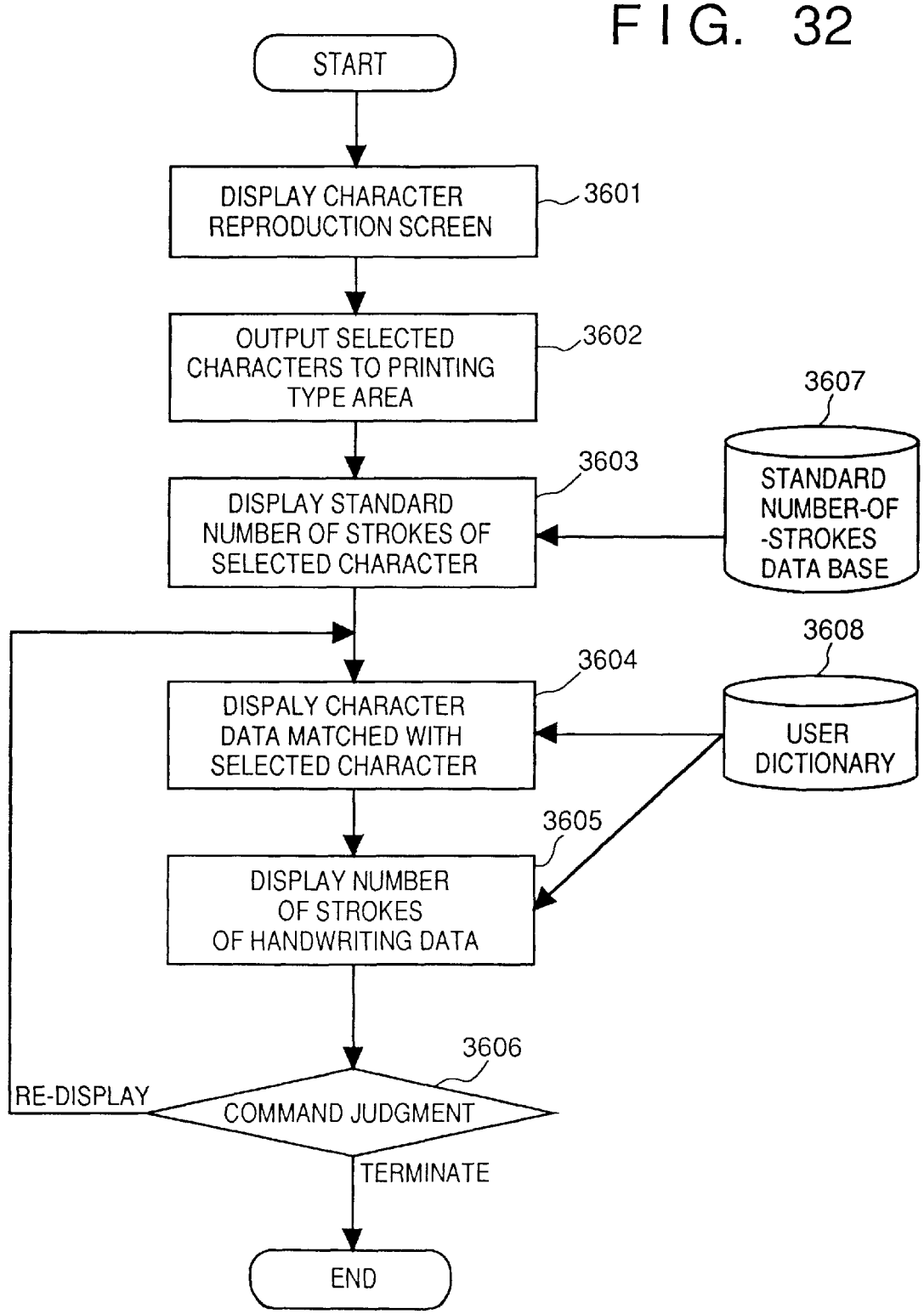
FIG. 32 is a flowchart showing a character reproduction process of this embodiment.

Next, the process flow in the handwritten character reproducing section will be described with reference to the flowchart of FIG. 32 and FIG. 38.

Figure 38:
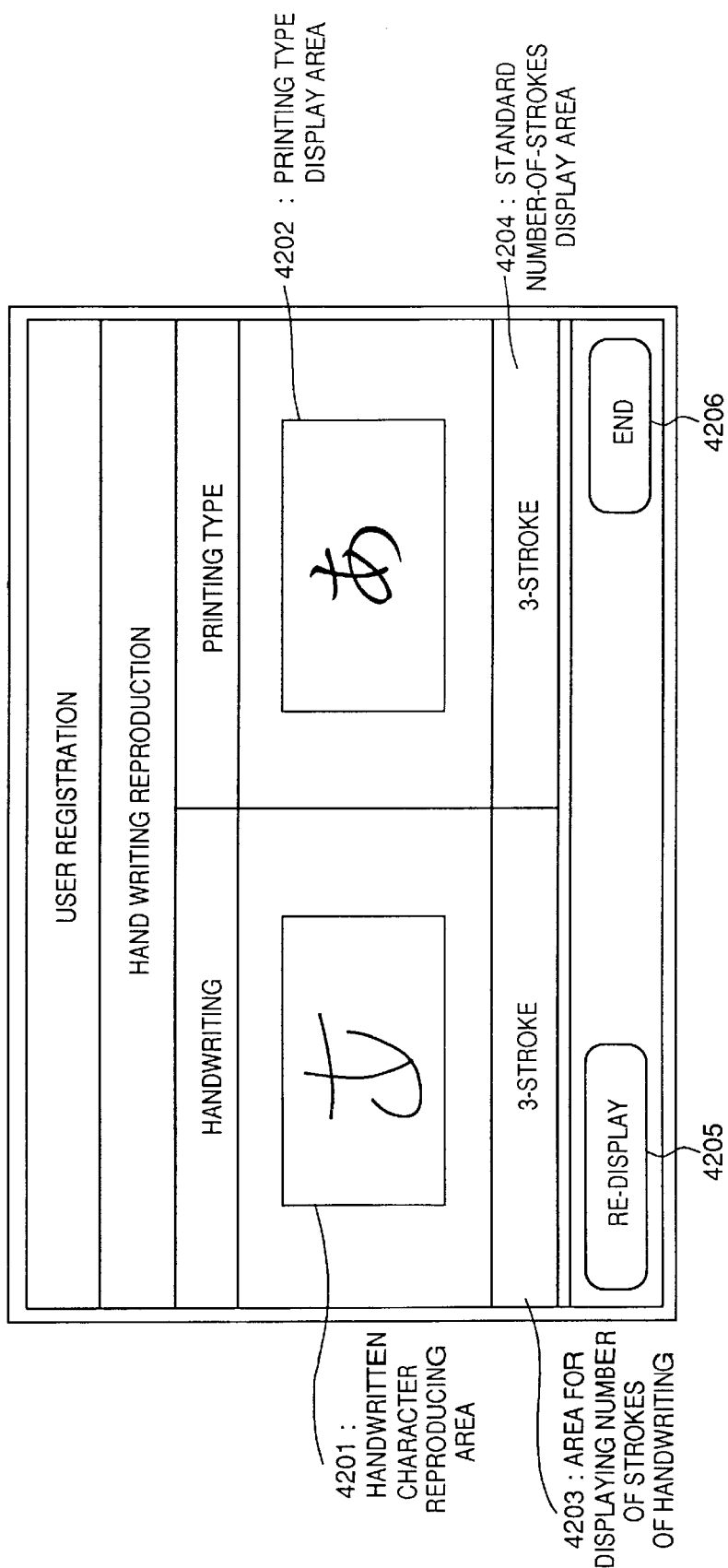
FIG. 38 is a diagram showing a handwriting reproduction screen of this embodiment.

In FIG. 38, numeral 4201 indicates a handwritten character reproduction area; numeral 4202 indicates a printing-type character display area; numeral 4203 indicates a handwritten character number-of-strokes display area; numeral 4204 indicates a standard number-of-strokes display area for the corresponding printing types; and numerals 4205 and 4206 indicate pen-tapping function call-up buttons.

In the user dictionary edit screen (FIG. 37), when the "handwriting reproduction" 4106 is designated, a framework of a screen as shown in FIG. 38 is formed, and displayed in the form of a pop-up window (step 3601).

Since there is assurance that a character code has been selected in the user dictionary editing section, the character is first displayed in an enlarged-font form in the printing type area (step 3602). Simultaneously with the font display, he number of strokes of the character is displayed (step 3603), which is effected by retrieval with respect to each character. To reproduce character data in the user Dictionary, it is necessary to first effect a unique extraction of data in the dictionary corresponding to the selected character. This can be effected by utilizing the above-mentioned character-code correspondence table. The dictionary data on the corresponding character includes coordinate points. Further, pen-down and pen-up information are added thereto, so that it is possible to determine the numbers of strokes of the handwriting to which the coordinate points belong. By using this data, the coordinate points in the same stroke are successively connected through a linear line, thereby drawing the handwriting (step 3604).

Further, the number of times pen-down is performed is counted as the number of strokes of the handwriting data and displayed (step 3605). When the button command operation (step 3606) is the "re-display" 4205, the drawing data thus reproduced is erased and the reproduction of the handwriting is started by utilizing the data in the dictionary again. When the "enter" 4206 is designated, the handwritten character reproduction window for this character is erased, and the control is returned to the registered-character editing section. In the example shown in FIG. 38, the handwritten character "あ" is selected, and the handwriting of the character is half-reproduced.

The preparation of the window shown here and the signal detection are conducted by using existing well-known techniques. Further, while in this example a pen is used as the pointing device, it is obviously possible to effect selection and writing through mouse operation.

While in the above embodiment the user registration patterns are re-arranged according to the numbers of strokes, an embodiment may be realized in which the re-arrangement is effected according to the date of registration.

Figure 44:
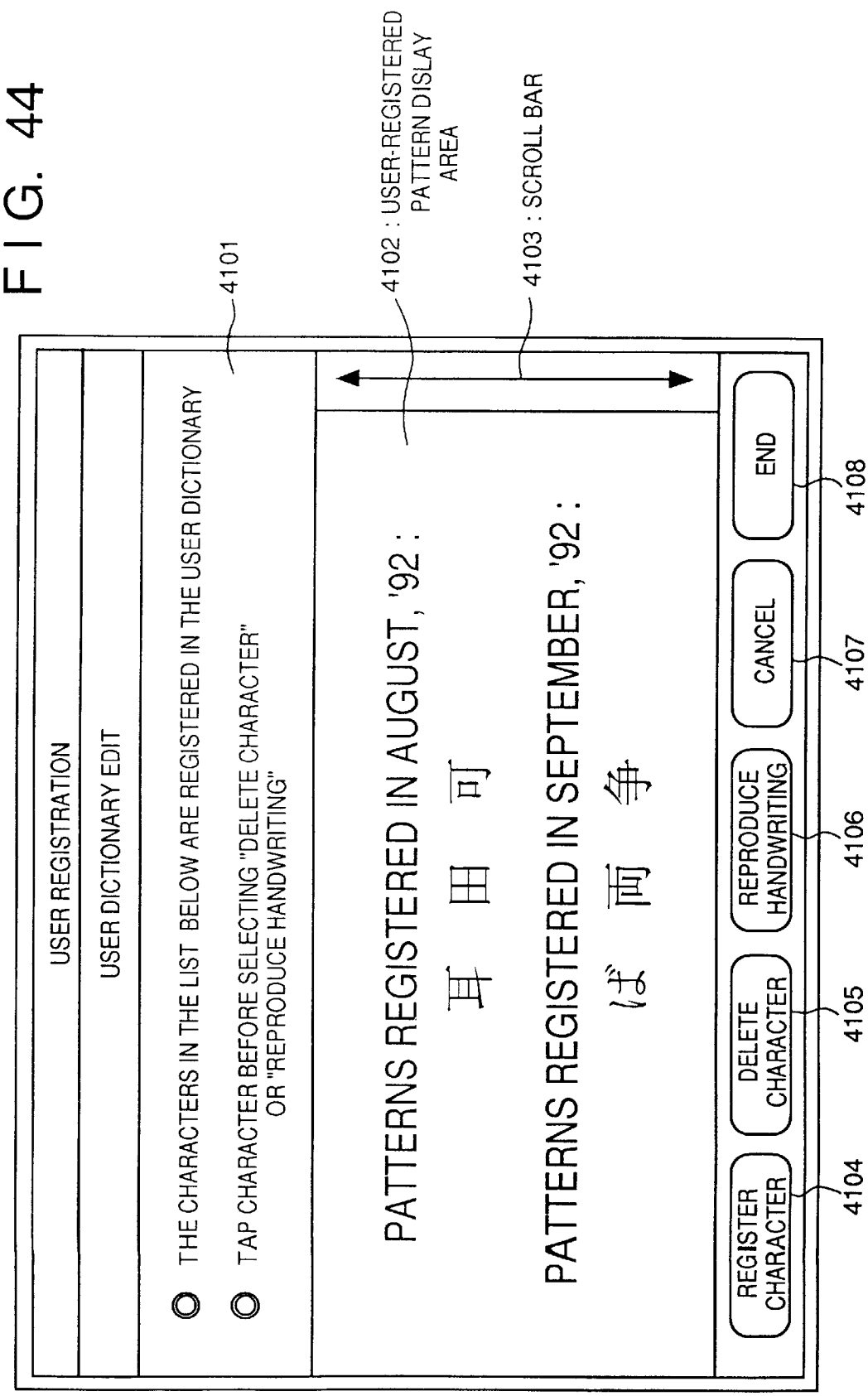
FIG. 44 is a diagram showing another example of the user-registered-character list display screen of this embodiment.

In FIG. 43, the number-of-strokes section of FIG. 40 is replaced by a section indicating dates of registration. The patterns are re-arranged according to their dates of registration, starting from the oldest one, with the result that a user registration pattern list display as shown in FIG. 44 is obtained. The section next to the character codes is a registration date storage area for storing the dates at which the registered patterns were registered.

Figure 45:
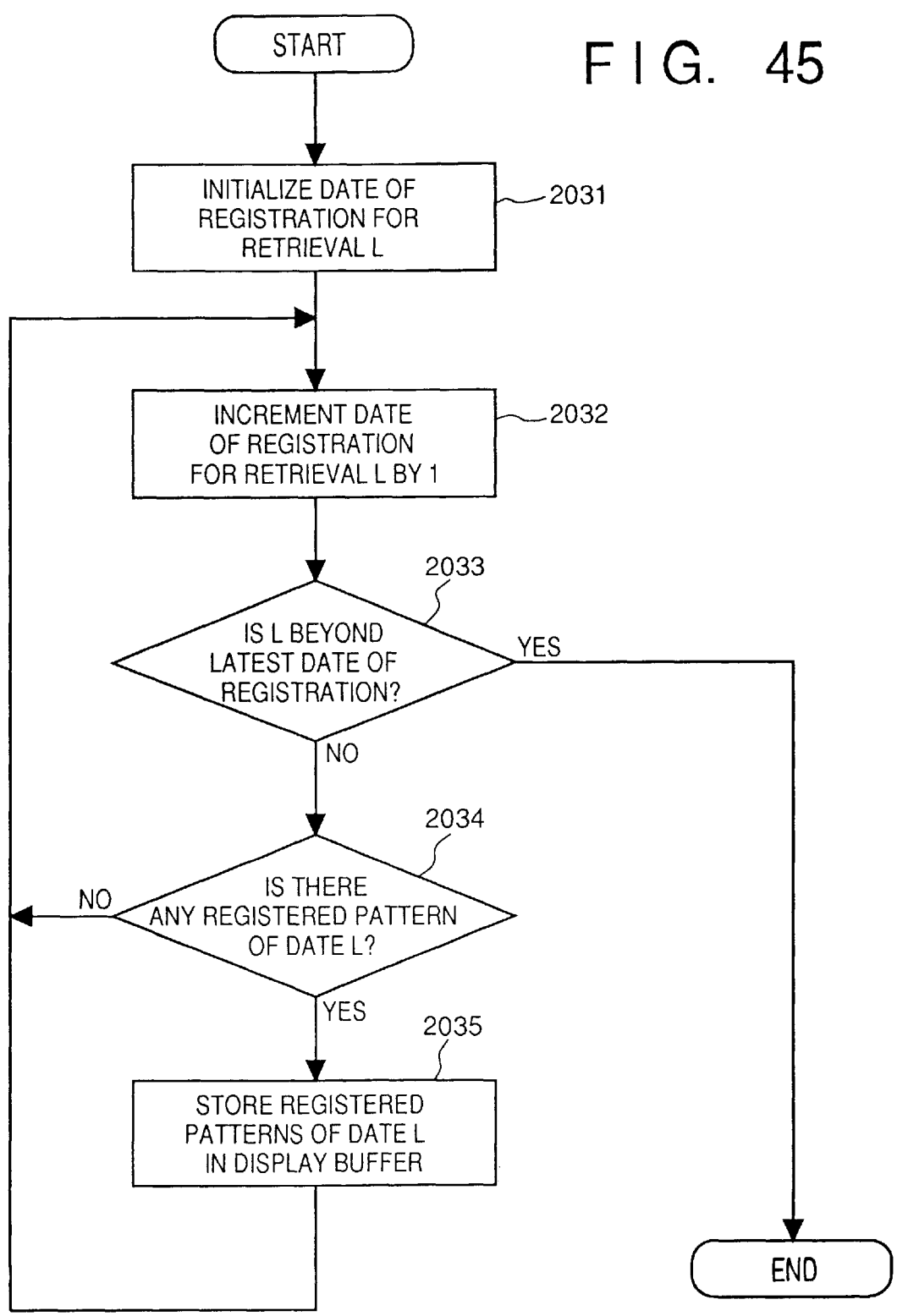
FIG. 45 is a flowchart showing another example of the registered-character pattern rearranging process of this embodiment.

The process flow will be described with reference to the flowchart of FIG. 45.

In step 2031, the storage area for the date of retrieval and registration is initialized, which is effected in a value that is one month earlier than the oldest date of registration of the user-registered patterns. While in this example the minimum unit of date is a month, it may also be a day or a hour. In step 2032, the value of the storage area L at the date of retrieval is incremented by one month to update the date of retrieval. In step 2033, it is checked whether the value of the storage area for dates of retrieval is in excess of the latest of the date of user registration or not. If it is, there no longer exists a registration pattern to be retrieved, so this retrieval process is terminated. If not, the procedure advances to step 2034.

In step 2034, it is checked whether there is any user-registered pattern at the date of the value L is in the user registration dictionary 1032 or not. If there is none in the user registration dictionary, the procedure advances to step 2032, and the user-registered pattern of the next date of registration is searched for. If there exists such a registration pattern, the procedure advances to step 2035, where the registration pattern is stored in the display buffer. In step 2035, the user-registered pattern at the date corresponding to the value L is searched for through the user registration dictionary 1032, and the character code of the registration pattern found and the date of registration thereof are sent to the registration pattern display means 1034, and the user-registered pattern display 4102 shown in FIG. 44 is effected.

The procedures of the steps 2032 to 2035 are repeated until there remains no registration pattern to be retrieved. In this way, the user-registered patterns are re-arranged according to the order of the dates of registration and transmitted to the display buffer, where the user-registered pattern display 4102 of FIG. 44 is effected.

Further, an embodiment is possible in which the patterns are re-arranged according to the radicals of kanjis.

FIG. 46 shows the interior of the user registration dictionary 1032, in which the user-registered patterns stored are: "糺 詳 紅 詞 縮 計 距 路" in the order of the storage No. of FIG. 46. The JI520 character code of "糺" is 0×647D, and the radical code of the radical "糸" is 0×6.

Figure 47:
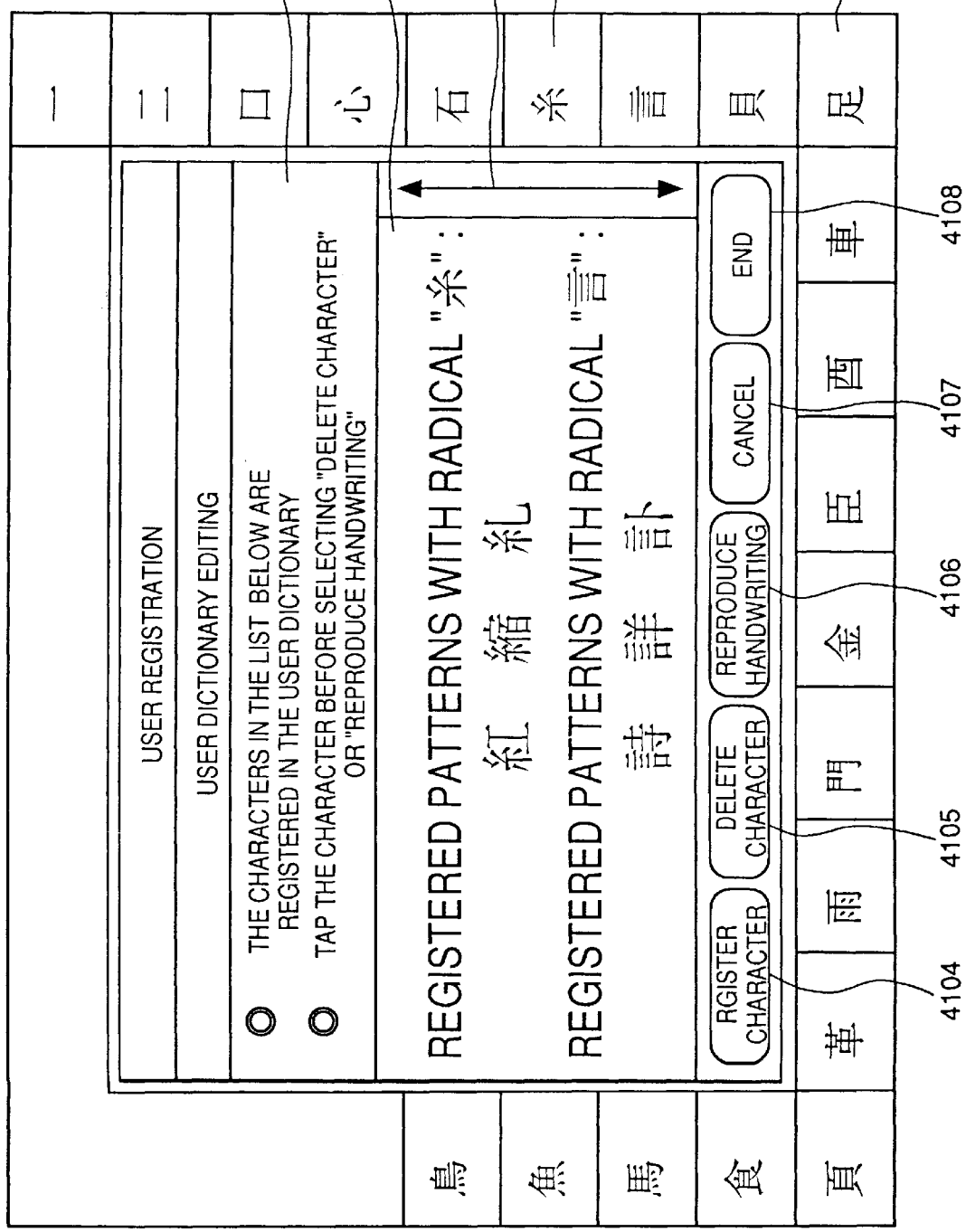
FIG. 47 is a diagram showing still another example of the user-registered-character list display screen of this embodiment.

FIG. 47 shows the display screen of this embodiment. In FIG. 47, numerals 4109 and 4110 indicate radical designation areas. When these areas are designated, the list display is effected from the user-registered patterns belonging to the displayed radicals. In FIG. 47, the radical designation area for the radical "糸", indicated at 4109, is designated, and user-registered patterns belonging to the radical "糸" are sequentially displayed from the user-registered patterns.

Figure 48:
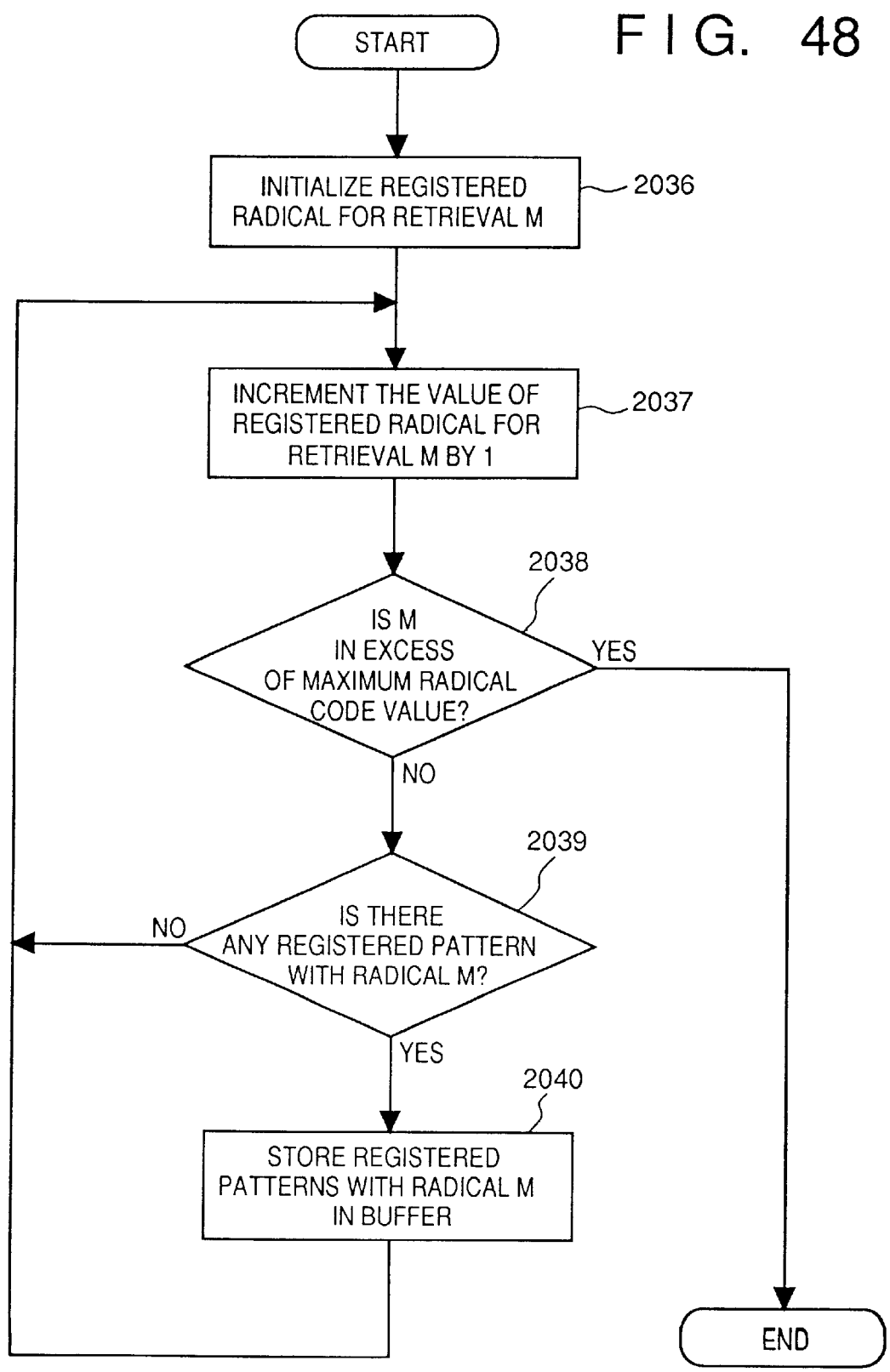
FIG. 48 is a flowchart showing still another example of the registered-character pattern rearranging process of this embodiment.

FIG. 48 is a flowchart illustrating this embodiment. In FIG. 46, the section for storing the numbers of strokes in FIG. 40 is replaced by a section for storing codes representing the radicals of kanjis to group the patterns according to their radicals. By conducting the procedures of the flowchart of FIG. 48 according to these radical codes, it is possible to re-arrange the user-registered patterns according to the radicals, and a list of patterns grouped according to the radicals is displayed on the screen as shown in FIG. 47.

This process will be described with reference to the flowchart of FIG. 48.

In step 2036, the storage area M for radical retrieval is initialized. Assuming that the radical search designation area for the radical "糸", indicated at 4109 in FIG. 46 has been designated, the retrieval and display is effected from the user-registered patterns belonging to the radical "糸", so the value 115 prior to the radical code for the radical "糸", is stored and initialized, and, in the steps from that onward, the retrieval is effected from the user-registered patterns of the radical "糸". In step 2037, the value of the radical retrieval storage area M is incremented by "1". By thus incrementing the value of M, the radicals are searched through to the end. If the value of M is "5" when this step is reached, the value becomes "6" by being incremented by 1, so that the value of the radical code for the radical "糸" is obtained. In step 2038, it is checked whether the value of the radical retrieval storage area M is beyond the range of the radical code or not. If it is, there exists no more pattern to be retrieved, so the process is terminated. If it is within the range, a pattern to be retrieved exists, so the procedure advances to step 2039.

In step 2039, it is checked whether there is a registered pattern corresponding to the value of the radical retrieval storage area M or not. When the value of the radical retrieval storage area M is "6", there exists a registered pattern of the radical code "6", as can be seen from FIG. 46, so the procedure advances to step 2040. When there is no registered pattern corresponding to the value of the radical retrieval storage area M, the procedure advances to step 2037 for the retrieval of the next registered pattern.

In step 2040, the user-registered pattern corresponding to the value of the radical retrieval storage area M is stored in a display buffer for displaying it by the registered pattern display means 1034. If the value of the radical retrieval storage area M is "6", the patterns: "糺 紅 縮" are stored in the display buffer since, as can be seen from FIG. 46, the registered patterns of the radical code "6", "糸", are 0×647D, 0×3948, and 0×3D4C. When these patterns are displaced by the registered pattern display means 1034, the display as shown in FIG. 47 is obtained. Then, the procedure advances to step 2037 to perform the search to the last. By this process, a user-registered pattern list arranged in the order of radical codes is realized.

The present invention is applicable to both a system composed of a plurality of apparatuses and a system composed of a single apparatus. It goes without saying that the present invention is also applicable to a case in which it can be realized by supplying programs to a system or an apparatus.

While the present invention has been described in its preferred embodiments, it is to be understood that modifications will occur to those skilled in the art without departing from the spirit of the invention. The scope of the invention is therefore to be determined solely by the appended claims.

What is claimed is:

1. A pattern recognizing apparatus comprising: candidate display control means for controlling a display of a plurality of candidate characters obtained by recognizing one input pattern;
   selection means for selecting one candidate character among the displayed candidate characters in accordance with a user's selection;
   frequency information updating means for updating a frequency information of reference patterns which is stored in a recognition dictionary, in relation to the user's selection of said one candidate character; and
   recognition dictionary reconfiguration means for reconfiguring an order of reference patterns stored in said recognition dictionary on the basis of a relationship between the updated frequency information.

2. A pattern recognizing apparatus according to claim 1, further comprising user registration means which, in a case that a reference pattern is added through user registration, adds the reference pattern to the recognition dictionary as a reference pattern of high order of reference.

3. A pattern recognizing apparatus according to claim 1, wherein each time said reference patterns are referred to, said frequency information updating means increases the frequency information of a corresponding item of frequency information.

4. A pattern recognizing apparatus according to claim 3, wherein, when at least one of the differences of said frequency information has reached a predetermined value, said recognition dictionary reconfiguration means reconfigures said recognition dictionary.

5. A pattern recognizing apparatus according to one of claim 1, wherein said recognition dictionary reconfiguration means reconfigures said recognition dictionary at a predetermined point in time.

6. A pattern recognizing apparatus according to claim 1, wherein said recognition dictionary reconfiguration means performs rearrangement of reference patterns according to an order of frequency of reference, determined from said frequency information, so as to initialize the frequency information.

7. A pattern recognizing apparatus according to claim 6, wherein, when said frequency of reference is not higher than a predetermined frequency, said recognition dictionary reconfiguration means deletes a corresponding reference pattern.

8. A pattern recognizing apparatus according to claim 1, wherein said recognition dictionary reconfiguration means checks whether a pattern is one which is repeatedly referred to even after a predetermined period of time has elapsed, and which, in a case that a pattern has been generated that is repeatedly referred to at the predetermined frequency after the lapse of the predetermined period of time, reconfigures said recognition dictionary.

9. A pattern recognizing apparatus according to claim 4, wherein said recognition dictionary reconfiguration means performs reconfiguration according to an order of frequency of reference, determined from said frequency information, so as to initialize the frequency information.

10. A pattern recognizing apparatus according to claim 9, wherein, when said frequency of reference is not higher than a predetermined frequency, said recognition dictionary reconfiguration means deletes a corresponding reference pattern.

11. A pattern apparatus according to claim 2, wherein said user registration means comprises registered pattern display means for displaying registered patterns and registered pattern information rearranging means for rearranging registered patterns displayed according to a predetermined condition.

12. A pattern recognizing apparatus according to claim 11, wherein said registered pattern information rearranging means rearranges registered patterns according to a number of strokes of each of the registered patterns.

13. A pattern recognizing apparatus according to claim 11, wherein said registered pattern information rearranging means rearranges registered patterns according to dates of registration of the registered patterns.

14. A pattern recognizing apparatus according to claim 11, wherein said registered pattern information rearranging means rearranges registered patterns according to radical information of the registered patterns.

15. Computer-executable process steps stored on a computer-readable medium, the steps to recognize patterns on the basis of a recognition dictionary, the steps comprising:
   a receiving step to receive a user's selection of one candidate character among a plurality of displayed candidate characters obtained by recognizing one input pattern;
   an update step to update a frequency information assigned respectively to a plurality of reference patterns on the basis of the user's selection of said one candidate character;
   a reconfiguring step to reconfigure an order of reference patterns stored in the recognition dictionary on the basis of a relationship between the updated frequency information assigned to respective reference patterns; and
   a recognizing step to recognize patterns on the basis of the reconfigured recognition dictionary.

16. Computer-executable process steps according to claim 15, wherein, in said updating step, each time the reference patterns are referred to, corresponding frequency information is increased, and
   wherein, in said reconfiguring step, the reconfiguration of said recognition dictionary is executed when at least one item of said frequency information has reached a predetermined value.

17. Computer-executable process steps according to claim 16, wherein, in said reconfiguring step, the reconfiguration is effected in an order of frequency of reference, determined from said frequency information, so as to reconfigure frequency information.

18. Computer-executable process steps according to claim 16, wherein, in said reconfiguring step, in a case that said frequency of reference is not higher than a predetermined level, a corresponding reference pattern is deleted.

19. Computer-executable process steps according to claim 17, wherein, in said reconfiguring step, in a case that said frequency of reference is not higher than a predetermined level, a corresponding reference pattern is deleted.

20. Computer-executable process steps according to claim 15, wherein, in said reconfiguring step, said recognition dictionary reconfiguration means checks whether a pattern is one which is repeatedly referred to even after a predetermined period of time has elapsed, and which, in a case that a pattern has been generated which is repeatedly referred to at a predetermined frequency after the lapse of the predetermined period of time, reconfigures said recognition dictionary.

21. Computer-executable process steps according to claim 15, wherein said relationship between the updated frequency information is calculated from updated frequency information of a plurality of reference patterns which are included in the same category and which have a different sequence of strokes from each other.

22. A pattern recognizing method in which patterns are recognized on the basis of a recognition dictionary, said pattern recognizing method comprising the steps of:
   displaying a plurality of candidate characters obtained by recognizing one input pattern;
   updating a frequency information assigned respectively to a plurality of reference patterns on the basis of a user's selection of one candidate character among the displayed candidate characters;
   reconfiguring an order of reference patterns stored in the recognition dictionary on the basis of a relationship between the updated frequency information; and
   recognizing patterns on the basis of the reconfigured recognition dictionary.

23. A pattern recognizing method according to claim 22, wherein said relationship between the updated frequency information is calculated from updated frequency information of a plurality of reference patterns which are included in the same category and which have a different sequence of strokes from each other.

24. A pattern recognizing method according to claim 22, wherein, in said step of updating the frequency information, each time the reference patterns are referred to, corresponding frequency information is increased, and
   wherein, in said step of reconfiguring said recognition dictionary, the reconfiguration of said recognition dictionary is executed when at least one item of said frequency information has reached a predetermined value.

25. A pattern recognizing method according to claim 24, wherein, in said step of reconfiguring said recognition dictionary, the reconfiguration is effected in an order of frequency of reference, determined from said frequency information, so as to reconfigure frequency information.

26. A pattern recognizing method according to claim 24, wherein, in said step of reconfiguring said recognition dictionary, in a case that said frequency of reference is not higher than a predetermined level, a corresponding reference pattern is deleted.

27. A pattern recognizing method according to claim 25, wherein, in said step of reconfiguring said recognition dictionary, in a case that said frequency of reference is not higher than a predetermined level, a corresponding reference pattern is deleted.

28. A pattern recognizing method according to claim 22, wherein, in said step of reconfiguring the recognition dictionary, said recognition dictionary reconfiguration means checks whether a pattern is one which is repeatedly referred to even after a predetermined period of time has elapsed, and which, in a case that a pattern has been generated which is repeatedly referred to at a predetermined frequency after the lapse of the predetermined period of time, reconfigures said recognition dictionary.

29. A pattern recognizing apparatus according to claim 1, wherein said relationship between the updated frequency information is calculated from updated frequency information of a plurality of reference patterns which are included in the same category and which have a different sequence of strokes from each other.

* * * * *

UNITED STATES PATENT AND TRADEMARK OFFICE
CERTIFICATE OF CORRECTION

PATENT NO.   : 6,208,755 B1
DATED        : March 27, 2001
INVENTOR(S)  : Shigeki Mori et al.

It is certified that error appears in the above-identified patent and that said Letters Patent is hereby corrected as shown below:

<u>Title page,</u>
Item [56], References Cited, U.S PATENT DOCUMENTS, "5,327,609" should read -- 5,329,609 --.

Figure 31:
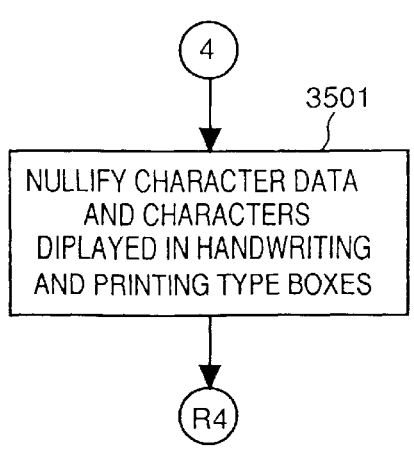
FIG. 31 is a flowchart showing a character registering operation in the new character registration process.

<u>Drawings,</u>
Figure 2, sheet 2, "DIAPLAY" should read -- DISPLAY --;
Figure 21, sheet 21, "DICTIONATRY" should read -- DICTIONARY --;
Figure 31, sheet 25, DIPLAYED" should read -- DISPLAYED --;
Figures 32 sheet 26, DISPLAY" should read -- DISPLAY --;
Fugure 47, sheet 41, RGISTER" should read -- REGISTER --.

<u>Column 14,</u>
Line 47, "sill" should read -- will --.

<u>Column 16,</u>
Line 2, "he" should read -- the --; and
Line 5, "Dictionary," should read -- dictionary, --.

<u>Column 17,</u>
Line 47, "115" should read -- 5 --.

Signed and Sealed this

Twenty-sixth Day of March, 2002

*Attest:*

*Attesting Officer*

JAMES E. ROGAN
*Director of the United States Patent and Trademark Office*